(12) United States Patent
Sulcer et al.

(10) Patent No.: US 11,550,603 B2
(45) Date of Patent: Jan. 10, 2023

(54) METHOD AND SYSTEM FOR SIZING A CLOUD DESKTOP FABRIC

(71) Applicant: Workspot, Inc., Campbell, CA (US)

(72) Inventors: David T. Sulcer, Campbell, CA (US); Shiva Prasad Madishetti, Campbell, CA (US); Lisa Wing San Chui, Campbell, CA (US); Anushree Kunal Pole, Campbell, CA (US); Joseph V. Semmelrock, Sr., Campbell, CA (US); Virabrahma Prasad Krothapalli, Campbell, CA (US); Amitabh Bhuvangyan Sinha, Campbell, CA (US); Jimmy Chang, Campbell, CA (US); Harpreet Singh Labana, Campbell, CA (US); Raminder S. Channe, Campbell, CA (US)

(73) Assignee: Workspot, Inc., Campbell, CA (US)

( * ) Notice: Subject to any disclaimer, the term of this patent is extended or adjusted under 35 U.S.C. 154(b) by 227 days.

(21) Appl. No.: 16/656,250

(22) Filed: Oct. 17, 2019

(65) Prior Publication Data

US 2021/0026661 A1    Jan. 28, 2021

Related U.S. Application Data

(60) Provisional application No. 62/878,320, filed on Jul. 24, 2019.

(51) Int. Cl.
*G06F 9/451* (2018.01)
*G06F 9/455* (2018.01)
*H04L 41/5009* (2022.01)
*H04L 67/1008* (2022.01)
*H04L 67/1095* (2022.01)

(52) U.S. Cl.
CPC .......... *G06F 9/452* (2018.02); *G06F 9/45558* (2013.01); *H04L 41/5012* (2013.01); *H04L 67/1008* (2013.01); *H04L 67/1095* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

2017/0013021 A1* 1/2017 Hoy .................... H04L 67/10
2017/0374136 A1* 12/2017 Ringdahl ............. H04L 67/10

\* cited by examiner

*Primary Examiner* — Lewis A Bullock, Jr.
*Assistant Examiner* — Melissa A Headly
(74) *Attorney, Agent, or Firm* — Nixon Peabody LLP

(57) ABSTRACT

A system and method for a virtual desktop system is disclosed. The system includes a master fabric region including resources for provisioning a desktop. The system includes a plurality of expansion fabric regions. Each of the expansion fabric regions including replicated resources for provisioning the desktop from the master fabric region. The system includes a control plane having a global pool. A client device application operated by a user associated with the global pool accesses a desktop from either the master fabric region or one of the expansion fabric regions. The control plane is operable to add a new expansion fabric region to the plurality of expansion fabric regions or eliminate one of the plurality of expansion fabric regions.

18 Claims, 18 Drawing Sheets

METHOD AND SYSTEM FOR SIZING A CLOUD DESKTOP FABRIC

PRIORITY CLAIM

This application claims priority to U.S. Provisional Application No. 62/878,320, filed on Jul. 24, 2019. The entirety of that application is hereby incorporated by reference.

TECHNICAL FIELD

The present disclosure relates generally to network-based systems. More particularly, aspects of this disclosure relate to sizing a cloud desktop fabric that allows provision of a desktop to users in different global regions from a cloud fabric having a master fabric region and replicated expansion fabric regions.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Remote desktop virtualization solutions have been available for over a decade. These solutions provide virtual desktops to network users. In remote desktop virtualization offerings, there is typically a capability of associating a remote desktop virtualization template in a particular datacenter with a remote desktop virtualization pool in the same datacenter as part of the general configuration model. This remote desktop virtualization template is customized with the image of the right desktop for a particular remote desktop virtualization use case.

FIG. 1A is a block diagram of a prior art standard remote desktop virtualization pool implementation system 10. In the example system 10 in FIG. 1A, a particular datacenter 12 may be designated for a region such as one designated "US WEST." In this example, the datacenter 12 includes a remote desktop virtualization template 14 optimized for call center workers. For the purposes of illustration, the datacenter 12 includes the standard call center desktop template 14 that has all the applications, software drivers, and other configurations needed for any call center worker to do their work. In this example, there may be a group of desktop users ("Call Center Workers Group") 16, including one example user ("John Doe") 18 who works in the call center.

A remote desktop virtualization pool 20 may be created that associates the group 16 with the remote desktop virtualization template 14 by a mapping. The created pool 20 is a configuration that may be called a "Call Center Pool" and is defined by a desktop service control plane (DSCP) 30.

Based on this configuration, when the user 18 requests a virtual desktop, the control plane 30 can instantiate a virtual desktop 32 based on the remote desktop virtualization template 14 by means of the appropriate APIs, and assign it to the user 18. The user 18 can immediately begin using the virtual desktop 32 with a desktop client 34.

Desktop users, such as the user 18, connect through the special desktop client 34 to some regional datacenter, and rely on infrastructure resources, such as a remote desktop virtualization gateway 36 and the virtual desktop 32, to experience the benefits of remote desktop virtualization. These are just illustrative, since virtual desktop infrastructure may require other kinds of infrastructure resources now or in the future and the same concepts apply.

However, replicating a single regional datacenter serving a single group of remote desktop virtualization users requires a series of manual operations and configuration steps. In order to handle a global use case, a large amount of duplicative setup activities is required as additional regional datacenters must be provisioned. Furthermore, each regional datacenter may be set up differently and therefore it is difficult to treat all the datacenters in the global use case in a uniform manner.

A remote desktop virtualization solution can also be provided using cloud infrastructure resources in various regional cloud datacenters. This may be built using Infrastructure as a Service (IaaS) capabilities of public cloud providers. When provided as a turnkey solution, this can be called a desktop service, sometimes referred to as Desktop as a Service (DaaS). While there are specific embodiments of DaaS today, the terms DaaS and desktop service are defined and used interchangeably in the context of this disclosure.

The state of the art for creating and managing a virtual desktop solution consists of tools provided by IaaS providers, and the cloud APIs they support. Virtual desktop providers will typically build a control plane to coordinate the creation, management, and monitoring of cloud infrastructure resources. For example, the control plane may register a set of a virtual networks, virtual storage resources, and more. Within a virtual network, the control plane may further register and coordinate the use of remote desktop virtualization gateways, a remote desktop virtualization enterprise connector, remote desktop virtualization templates, remote desktop virtualization connection brokers, and more.

FIG. 1B shows a simplified view of a remote desktop virtualization system 50 using a cloud-based remote desktop virtualization to provide a cloud desktop service. In order to provide remote desktop virtualization, a control plane 52 is used to coordinate the creation and management of cloud infrastructure resources. For example, the control plane 52 may register a set of a virtual networks, virtual storage resources, and more. Within a virtual network, the control plane 52 may further register and coordinate the use of remote desktop virtualization gateways, remote desktop virtualization templates, and other cloud infrastructure resources possibly including, but not limited to, a remote desktop virtualization enterprise connector, remote desktop virtualization connection brokers, and ad-hoc virtual machines to serve other purposes. In this example, the control plane has three separate groups of call center workers set up to use regional pools 54*a*, 54*b*, and 54*c*. Each of the regional pools 54*a*, 54*b*, and 54*c*, has respective templates that are created manually. The templates are run in different regional cloud datacenters 56*a*, 56*b*, and 56*c*. Each of the regional pools 54*a*, 54*b*, and 54*c* have respective worker groups 60*a*, 60*b*, and 60*c*. Individual users for each group 60*a*, 60*b*, and 60*c*, such as users 62*a*, 62*b*, and 62*c*, may access resources from the respective regional cloud datacenters 56*a*, 56*b*, and 56*c*.

Similar to the above single pool, each of the regional pools 54*a*, 54*b*, and 54*c*, such as the regional pool 54*a*, is associated with a desktop template 70 optimized for call center workers in a respective call center workers group. In this example, the desktop template 70 is a standard call center desktop template that has all the applications, software drivers, and other configurations needed for any call center worker to do their work. The datacenter 54*a* includes desktops 72 and a virtual desktop interface gateway 74. These resources may be accessed via a desktop client 76.

The regional pool 54*a* is defined by the control plane 52. Based on this configuration, when the user 62*a* associated with the regional pool 54*a* requests a virtual desktop, the control plane 52 can instantiate the virtual desktop 72 from the template 70 by means of the appropriate APIs, and assign it to the user. Desktop users such as the user 62*a* connect through the desktop client 76 to the regional datacenter 56*a*, and rely on infrastructure resources such as a remote desktop virtualization gateway 74, the remote desktop virtualization template 70, and the virtual desktop 72 to experience the benefits of a virtual desktop infrastructure.

As shown in FIG. 1B, remote desktop virtualization infrastructures are typically set up in multiple regional cloud datacenters. The cloud infrastructure resources of each of the regions 56*a*, 56*b*, and 56*c*, are set up and managed separately. Expanding or shrinking the fabric is extremely challenging, and any benefit of uniformity between the regions relies on painstaking administrative efforts to make them structurally and semantically similar to each other. Operators can struggle to cope with the complexity caused by divergence between the regions. Thus, managing a large-scale collection of known multi-region desktop service implementations requires human intervention and drives up costs.

Further, with the typical desktop service today, once a desktop user has been assigned to a particular regional cloud datacenter, it is not very easy to move them to a different part of the world. For example, a desktop user may temporarily travel to, or even be permanently transferred to, another location that has a much closer network proximity to a different regional cloud datacenter. The desktop client connecting from another part of the world can still connect to the original regional datacenter 56*a* but only with the possibility of subjecting the desktop user to a significant loss of performance of the virtual desktop and an impacted user experience. This is because, unlike having their own laptop computer, there is a direct performance impact in connecting to a desktop that must be accessed through a remote peer-to-peer network or some other WAN.

Thus, there is a need for a system that provides a cloud fabric of desktop infrastructure to offer virtual desktop performance to users throughout the world. There is another need for a virtual desktop system that uses a replicated regional fabric to provide virtual desktops to users across different regions without delay or loss of performance. There is another need for a system that automatically adjusts the capabilities of a cloud desktop fabric based on user needs.

SUMMARY

One disclosed example is a virtual desktop system that includes a master fabric region including resources for provisioning a desktop. The system also includes expansion fabric regions, each of the expansion fabric regions including resources for provisioning the desktop replicated from the master fabric region. The desktop is accessible by a user from one of the master fabric region or the plurality of expansion fabric regions. A control plane is operable to add a new expansion fabric region to the plurality of expansion fabric regions or eliminate one of the plurality of expansion fabric regions Another disclosed example is a method to expand a cloud desktop fabric to provide access to desktops to geographically dispersed users. The cloud desktop fabric includes a master fabric region and an expansion fabric region. The expansion fabric region has replicated resources from the master fabric region to provide desktops to users in a global pool. Usage data is collected from users provided with access to desktops in the cloud desktop fabric via a control plane. A need for increasing capacity of the cloud desktop fabric is determined. A new expansion fabric region is created via the control plane. The resources to provide desktops is replicated from the master fabric region to the new expansion fabric region. Access to a desktop on the new expansion fabric region is allowed to a new user.

Another disclosed example is a method to adjust resources for a cloud desktop fabric to provide access to desktops to geographically dispersed users. The cloud desktop fabric includes a master fabric region and expansion fabric regions. Each of the expansion fabric regions has replicated resources from the master fabric region to provide desktops to users in a global pool. Usage data is collected from users provided with access to desktops in the cloud desktop fabric via a control plane. An underutilization of the cloud desktop fabric is determined. One of the plurality of expansion region fabrics is eliminated via the control plane.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
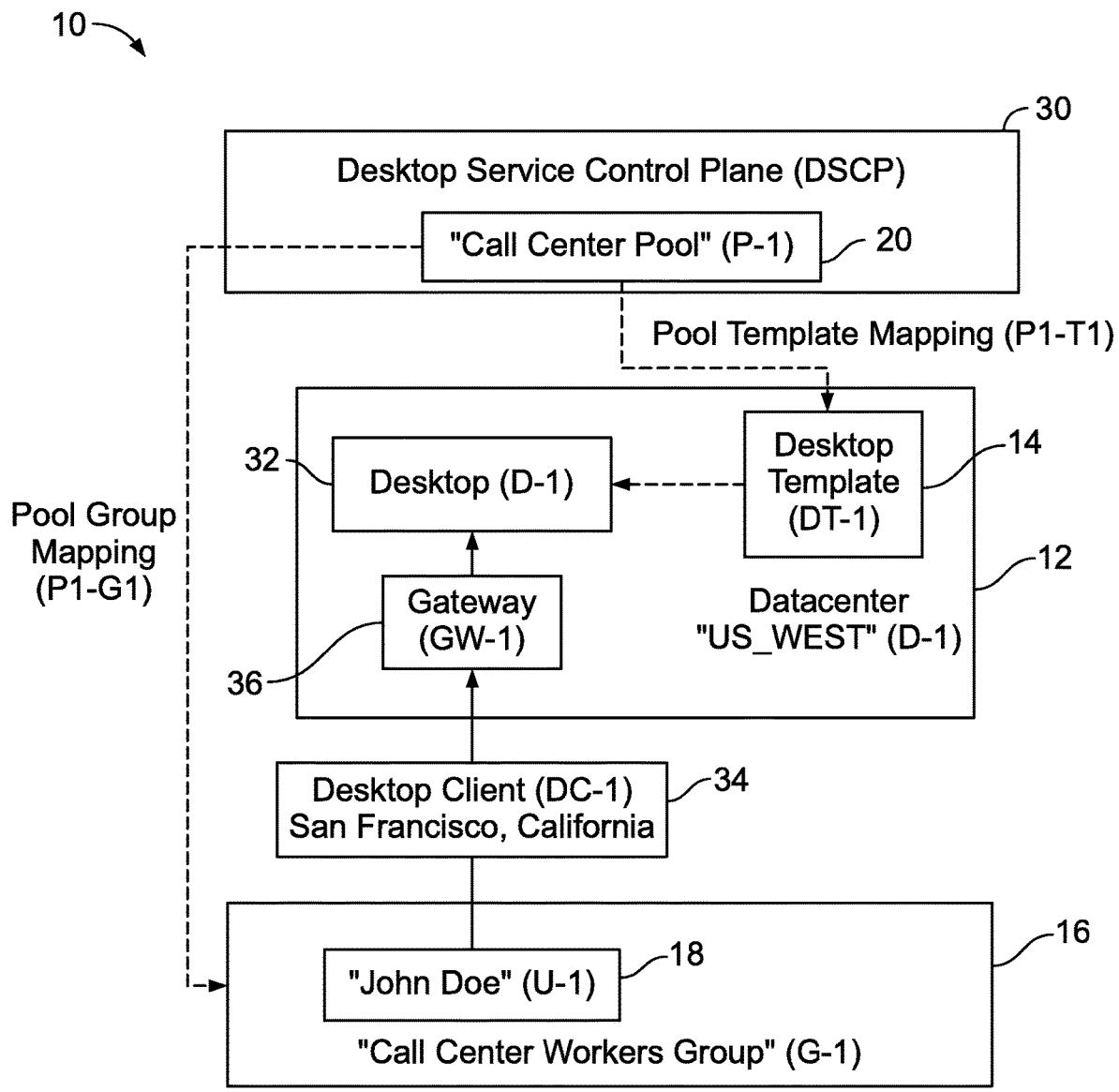
FIG. 1A is a prior art standard remote desktop virtualization pool implementation system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a cloud desktop fabric that provides a flexible way of managing cross-region access to a desktop service. In one implementation, the cloud desktop fabric can be created and managed by a desktop service control plane. The desktop service control plane automates the activities involved with standing up a single fabric region and defines how it can be automatically extended to cover any number of additional fabric regions.

The cloud desktop fabric is a distributed network of desktop service capabilities that are centrally administered and managed. The system is elastic, which allows the ability to expand the global footprint of the cloud desktop service fabric through automation. The system may be self-adjusting, allowing the cloud desktop service fabric to expand or shrink based on demand or other conditions. The system allows for optimal desktop placement where users always access their desktops from a local datacenter. The system allows for desktop migration where users can physically relocate and still have high performance.

The following are definitions of terms used in this disclosure.

An agent is software that performs certain operations and monitoring tasks that has direct access to, or runs on, some virtual computing resource and may maintain a duplex communication channel with a desktop service control plane.

An API is a set of specific, controlled, well-defined functional entry points to get, create, update, and delete resources and otherwise change the state of a remote system.

A cloud API is, in this context, an API specific to an IaaS.

A connection broker is desktop service resource sometimes used to dynamically connect desktop clients with desktops.

A datacenter is a collection of computing resources, such as servers, in one physical location.

A desktop is a computer's interactive desktop or application, or other experience provided by remote desktop virtualization via a desktop service.

A desktop client (sometimes called a VDI client) is a software application that provides display and input access to a desktop as part of a desktop service. It may be installed on a standard desktop or mobile operating system, or be pre-installed on dedicated hardware devices, or downloaded dynamically via a web browser application, or deployed in some other way. Like an agent, it may also perform certain operations and monitoring tasks and may maintain a duplex communication channel with a desktop service control plane.

A desktop service resource refers to some virtualized hardware, networking service, or virtual machine, other than the desktops themselves, that exists to support a desktop service.

A desktop service (sometimes referred to as Desktop as a Service, or DaaS in this disclosure) is remote desktop virtualization hosted on a public or private cloud, provided as a turnkey managed service.

A desktop service control plane is an application that implements and manages a desktop service.

A desktop template is a desktop service resource used to define a prototypical desktop, including specific configurations, installed applications, and everything else needed to instantiate a desktop for some category of desktop users.

A desktop user is a person who uses a desktop.

An enterprise connector is a desktop service resource used to integrate the network of a desktop service with the network services, including but not limited to directory services that support authentication and authorization.

An expansion fabric region is a fabric region created as a regional replica of the master fabric region.

A fabric region is a set of desktop service resources made available in a particular regional cloud datacenter as part of a cloud desktop fabric.

A gateway is a type of desktop service resource running a service that manages secure access to a desktop supporting protocols including a remote display protocol. In this disclosure, gateways are accessed as a gateway cluster unless explicitly noted otherwise.

A gateway cluster is a set of gateways managed together for load balancing purposes.

A global pool is a logical definition supporting the instantiation of pool desktops instantiated from the same desktop template that can span multiple regional cloud datacenters and be available with high performance from different regions of the world.

Infrastructure as a service (IaaS) is a set of virtualized computing resources available from a public cloud provider.

An infrastructure template is a collection of desktop service resources and/or definitions that provide a blueprint for replicating a regional cloud datacenter.

A cloud desktop fabric is a scalable virtual desktop interface system that relies on replicated regional fabric regions to allow a user anywhere in different regions to access a virtual desktop interface.

Hub and spoke is a distribution paradigm that is premised on centralized distribution to remote nodes.

A master fabric region is a fabric region that acts as a model for creating expansion fabric regions as regional replicas.

Network proximity is a measure of the performance of a graphical protocol connection based on minimizing the latency of response, usually due to the distance from a datacenter and/or directness of the connection.

A non-persistent desktop user is a desktop user that is allocated a new desktop for each login session.

A persistent desktop user is a desktop user that is allocated a specific desktop for exclusive use over multiple connection sessions.

Pool desktops are a set of desktops managed by the desktop service control plane as a unit.

A regional cloud datacenter is a datacenter providing virtualized computing resources to implement a desktop service for efficient access within a single geography or availability zone.

Remote desktop virtualization is software technology that separates the desktop environment and associated application software from the physical client device that is used to access it in a client/server environment.

A regional pool is a logical definition supporting the instantiation of pool desktops instantiated from the same desktop template within a regional cloud datacenter.

A regional replica is a specific infrastructure, definition, or configuration, that are instantiated within a particular fabric region, so that it is functionally similar enough to some other fabric region to provide the same services.

A virtual application is the capability to access a user experience for a particular application running remotely.

A virtualized computing resource is a virtual machine that is created by an Infrastructure as a Service (IaaS) provider.

A virtual machine is an emulation of a physical computer that can be accessed over a network.

A virtual network is hardware and software network resources combined into a single, software-based administrative entity, made available by an Infrastructure as a Service (IaaS) provider.

Virtual storage is storage resources provided as part of Infrastructure as a Service.

Figure 2:
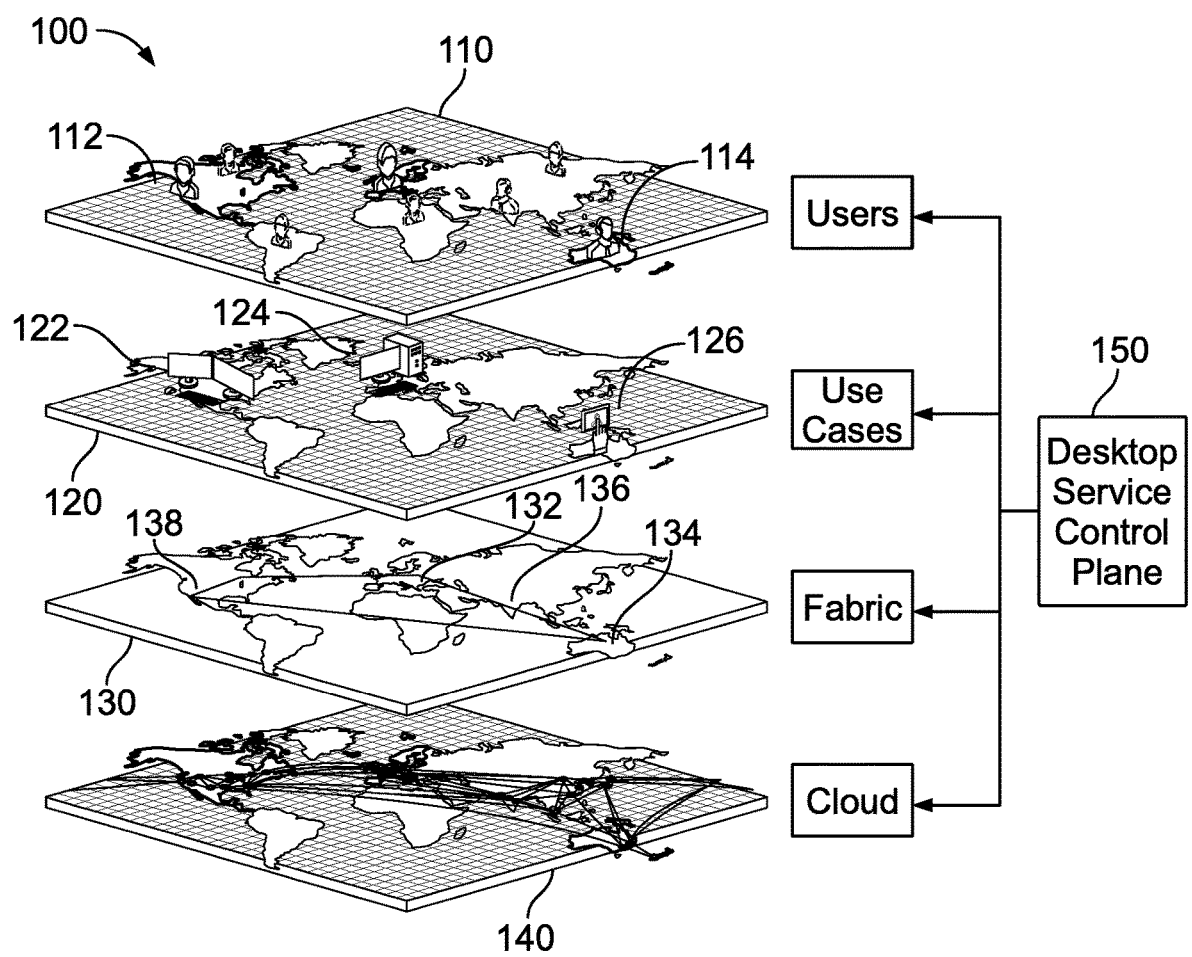
FIG. 2 is a high-level block diagram illustrating an example cloud desktop fabric allowing access to virtual desktops globally.

FIG. 2 shows a high level block diagram of a cloud desktop service system 100. The cloud desktop service system 100 may also be referenced as a global desktop system because it provides virtual desktops for users globally. The cloud desktop service system 100 includes four layers, a users layer 110, a use cases layer 120, a fabric layer 130, and a cloud layer 140. The users layer 110 represents desktop users having the same computing needs, that may be located anywhere in the world. In this example, the users layer 110 includes users 112 and 114, who are in geographically remote locations and access desktops via computing devices. The use cases layer 120 represents common logical global pools of desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. Pools such as the developer desktop pool 122 or the engineering workstation pool 124 allow users in the pool a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others. The resources are maintained as fabric regions such as a master fabric region 132, and expansion fabric regions 134, 136, and 138. As will be explained below, the expansion fabric regions such as the regional fabric regions 134, 136, and 138 can be added or removed as needed. The master fabric region 132 is the configuration of record. The cloud layer 140 implements the resources defined by the use case layer 120 and fabric layer 130, including virtual desktops, infrastructure, and other virtual resources, all of which are virtual machines or other virtual resources hosted in a public cloud.

FIG. 2 depicts the two desktop users 112 and 114 in different parts of the world who are each able to access an example high-performance desktop service from the cloud desktop service system 100. As will be explained below, the cloud desktop service system 100 eliminates the need to divide identical users into user groups specific to a region. Rather, all users having identical needs throughout the world are considered as a single worker pool. Users, such as users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 2. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

Figure 1B:
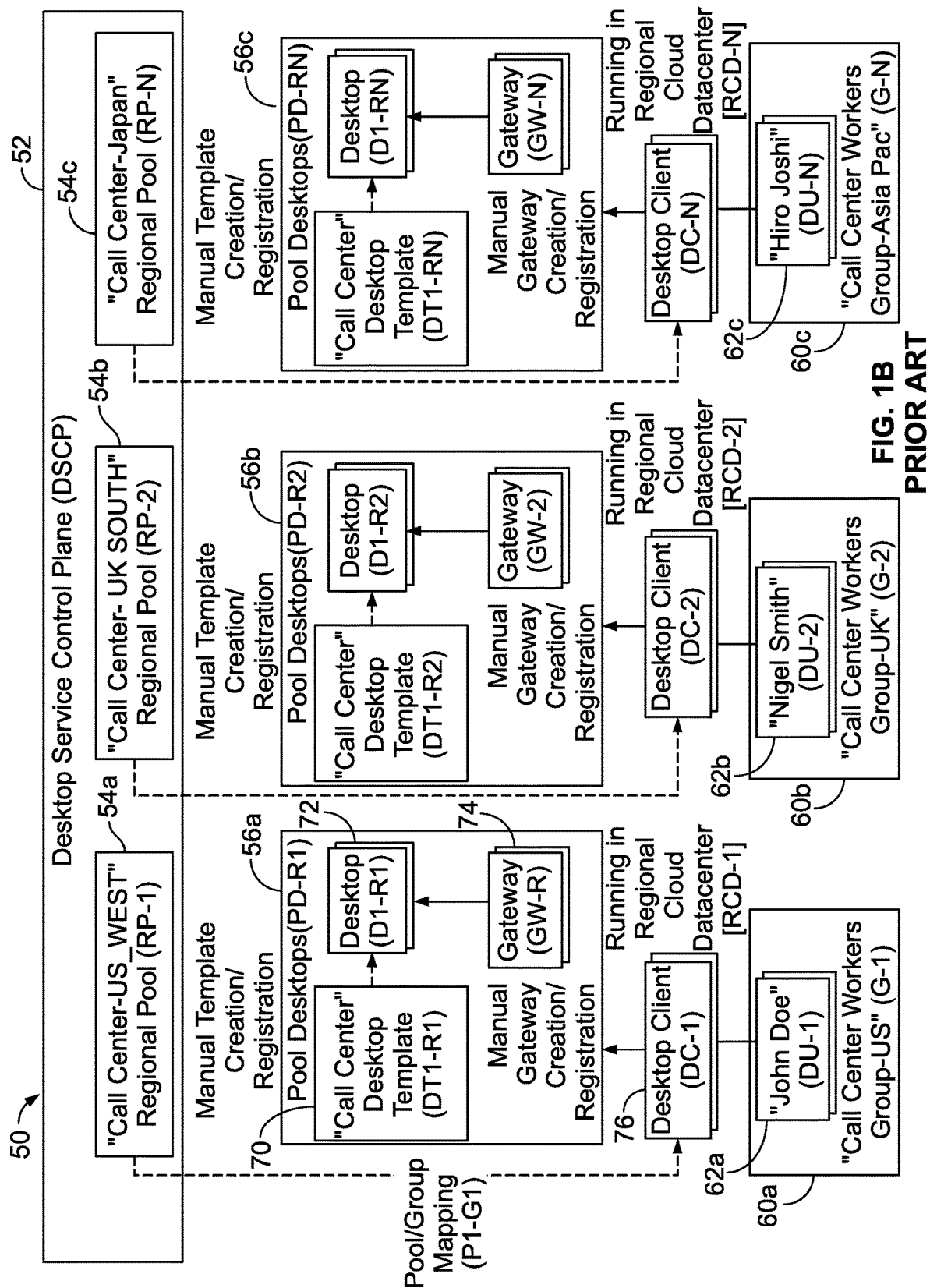
FIG. 1B is a prior art standard multi-region remote virtual desktop system with multiple regional cloud datacenters to provide cloud desktop service.
Figure 3A:
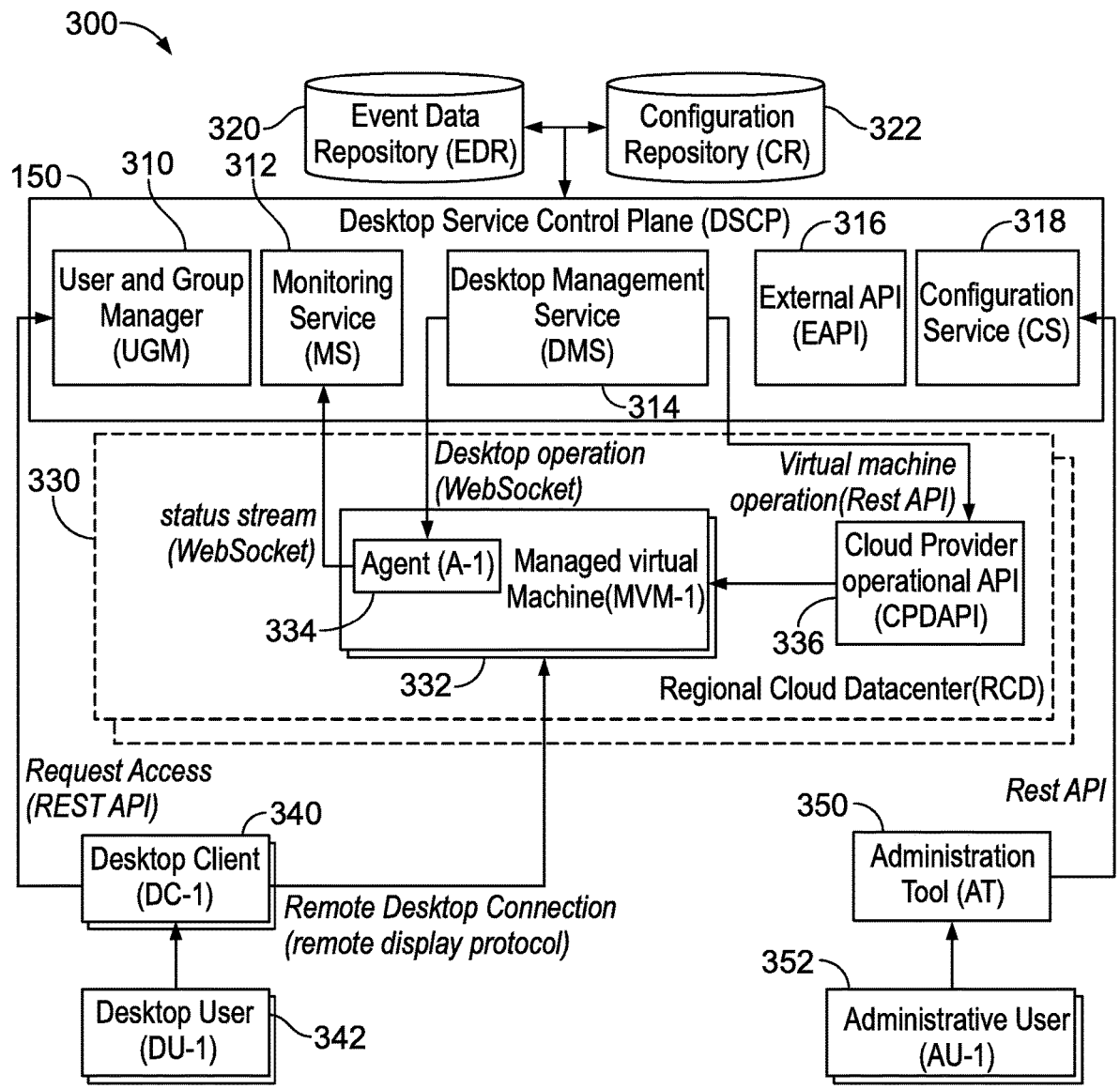
FIG. 3A is a block diagram illustrating the system architecture of the example desktop service control plane in FIG. 2.

FIG. 3A is a block diagram of an example architecture 300 of the desktop service control plane 150 in FIG. 2. The control plane 150 includes a user and group manager 310, a monitoring service 312, a desktop management service (DMS) 314, an external API (EAPI) 316, and a configuration service (CS) 318. The control plane 150 may access an event data repository 320 and a configuration repository 322. The architecture 300 includes an example regional cloud datacenter 330. As will be explained below the regional cloud datacenter 330 may host fabric regions that may be part of the cloud desktop service 100 in FIG. 1. Although only one regional datacenter 330 is shown, it is to be understood that the control plane 150 may facilitate numerous regional datacenters. Such datacenters include servers that host the various applications. The datacenter typically comprises IT infrastructure that is managed by IT personnel. The IT infrastructure may include servers, network infrastructure, software, and so on. If there is an issue related to an application reported by a user, the IT personnel can check the health of the infrastructure used by the application. A datacenter may include a firewall to control access to the applications hosted by the datacenter. The firewall enables computing devices behind the firewall to access the applications hosted by the datacenter, but prevents computing devices outside the firewall from directly accessing the applications. The firewall may allow devices outside the firewall to access the applications within the firewall using a virtual private network (VPN). An example desktop client 340 may be requested by a desktop user 342. An administration tool 350 is operated by an administrative user 352. As will be explained, the administration tool 350 allows the administrative user 352 to configure the control plane 150.

The monitoring service 312 makes both routine and error events available to administrators and can analyze operational performance and reliability. The desktop management service 314 interacts with one or more managed virtual machines (MVMs) 332 in the regional cloud datacenter 330. These managed virtual machines 332 may include provision managed virtual machines of various types, including both desktop service resources (for example, gateways or desktop templates) and regional pools consisting of desktops themselves. The data center 330 also includes an install agent software 334 installed on a managed virtual machine 332 that can perform desktop operations on, and collect data from, the managed virtual machine 332 at the direction of the control plane 150.

Operations are performed on a managed virtual machine 332 using a Cloud provider operational API (CPOAPI) 336 provided as part of the infrastructure as a service. For example, the operational API may be used for powering on or powering off a managed virtual machine. The external API (EAPI) 316 also supports integration and automation programmatically. Users and groups are registered and managed, and security roles are assigned.

The example desktop client 340 communicates with the desktop service control plane 150 and also supports a remote display protocol in order for users to connect to a desktop application run by the regional cloud datacenter 330.

The administration tool 350 works directly with the data control plane 150 as its primary human interface. The administration tool 350 allows the administrative user 352 to configure the functions of the control plane 150 through the configuration service 318. The configuration service 318 supports editing and persistence of definitions about the desktop service, including subscription information and policies.

Figure 3B:
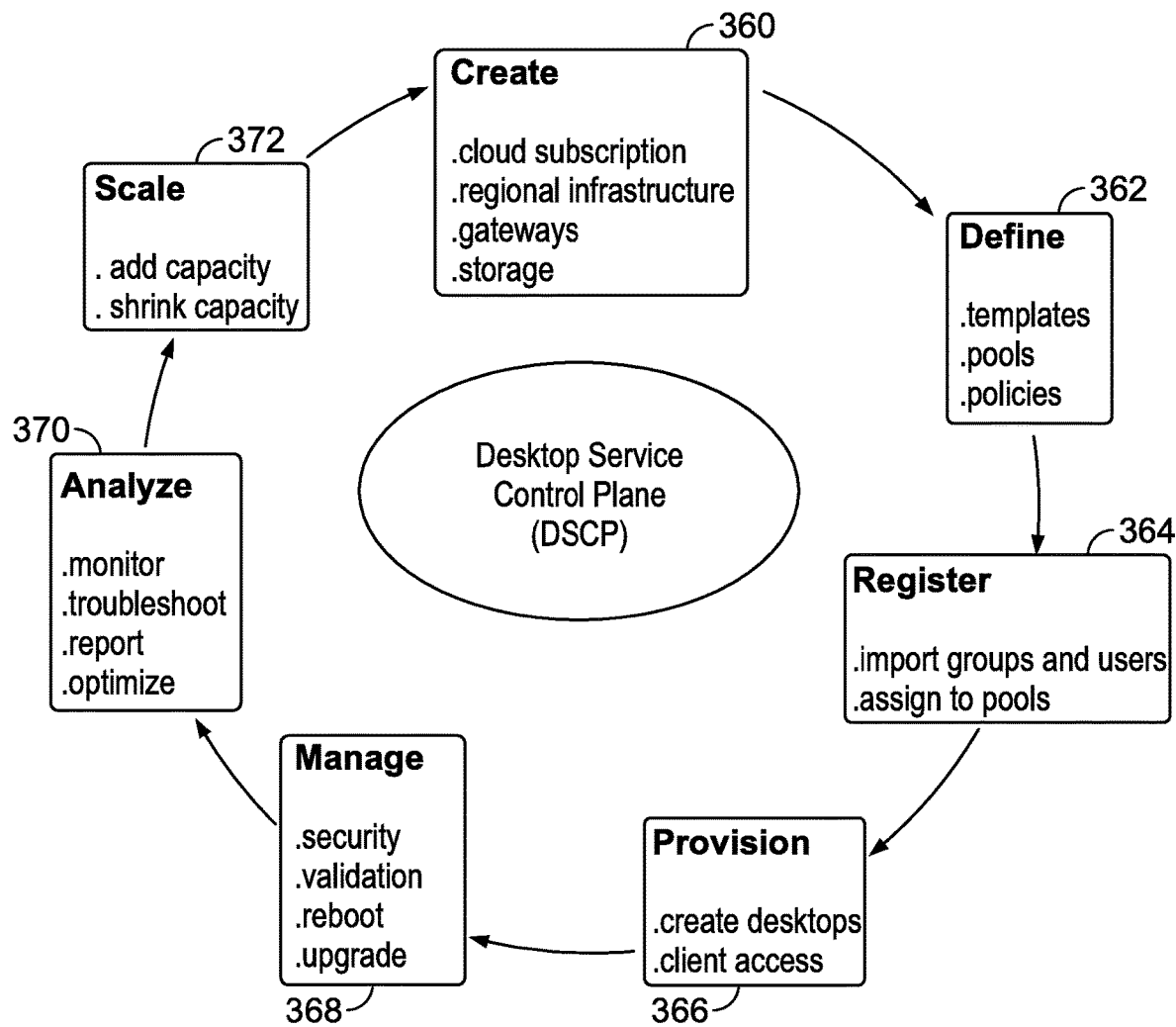
FIG. 3B is a diagram of the functions of the example desktop service control plane in FIG. 2.

A high-level view of some example functions and typical sequence of the use of functions of the desktop service control plane 150 is shown in FIG. 3B. This diagram is not meant to be complete and inclusive of everything that can be accomplished by the desktop service control plane 150, nor is it meant to describe a fixed sequence of these activities. The functions may include creation functions 360, definition functions 362, registration functions 364, provisioning functions 366, management functions 368, analysis functions 370, and scaling functions 372. Thus, the creation functions 360 may include creating cloud provider subscriptions, regional infrastructure, gateways, and storage. The definition functions 362 may include defining templates, pools, and policies. The register functions 364 may include registering support groups and users, and assignment to pools. The provisioning functions 366 may include creating desktops and client access. The management functions 368 may include security, validation, rebooting, and upgrades. The analysis functions 370 may include monitoring, troubleshooting, reporting, and optimization. The scaling functions 372 may include adding capabilities and shrinking capabilities to manage resource consumption.

Figure 4A:
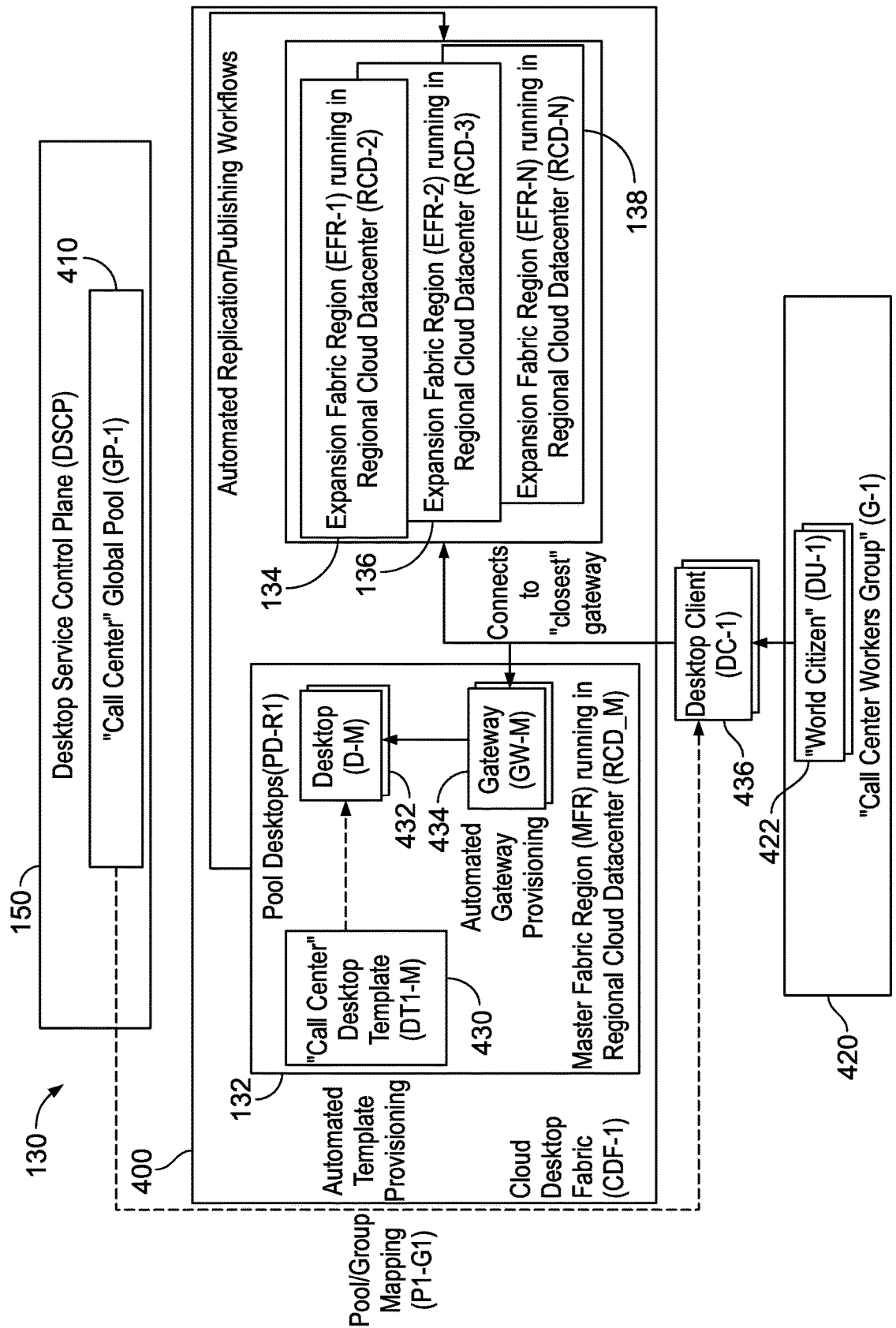
FIG. 4A is a block diagram of the example cloud desktop fabric in FIG. 2 including an example global pool.

FIG. 4A is a block diagram of the example fabric layer 130 in FIG. 2. The fabric layer 130 includes a cloud desktop fabric 400. The fabric layer 130 includes different fabric regions, which may be created within a regional cloud data center such as RCD-M 330 in FIG. 3A. Collectively, a named set of fabric regions managed this way are known as a cloud desktop fabric such as the cloud desktop fabric 400. The named set of fabric regions may also be referenced as a global desktop fabric as it may provide desktops to users globally. As will be explained below, the cloud desktop fabric 400 is elastic, scalable, and allows for uniform management and monitoring. The cloud desktop fabric 400 may have numerous fabric regions, running in (hosted by) numerous regional cloud datacenters as will be explained below.

In this example, the data control plane 150 defines a global pool 410 that may be a call center desktop pool. The global pool 410 is associated with users of similar desktops. It is to be understood that the data control plane 150 may have multiple global pools, such as the global pool 410, for different needs of users. The global pool 410 is configured to be used by a respective global worker group 420. The worker group 420 may include multiple users 422 in geographically dispersed physical locations.

The global pool 410 in this example is configured to use a desktop template 430 in the master fabric region 132. The desktop template 430 in this example is optimized for call center workers in the respective call center workers group 420. The desktop template 430 is thus a standard call center desktop template that has all the applications, software drivers, and other configurations needed for any call center worker 422 in the call center workers group 420 to do their work. The master fabric region 132 includes desktops 432 and a remote desktop virtualization gateway 434. The resources may be accessed via a desktop client 436.

Based on this configuration, when the user 422 associated with the global pool 410 requests a virtual desktop to be hosted in the master fabric region 132, the control plane 150 can instantiate the virtual desktop 432 from the template 430 by means of the appropriate APIs, and assign it to the user 422. Desktop users such as the user 422 connect through the desktop client 436 to the regional datacenter (RCD-M) that hosts the master fabric region 132. Thus, the cloud desktop service relies on infrastructure resources, such as the remote desktop virtualization gateway 434, the remote desktop virtualization template 430, and the virtual desktop 432 in different fabric regions, to provide the benefits of remote desktop virtualization.

The necessary desktop service resources are automatically provisioned to create the master fabric region 132 providing access to virtual desktops 432. The master fabric region 132 is the starting point for defining the desktop service. The choices for provisioning of desktop service resources, and their configurations, are performed in the context of the master fabric region 132. Additional expansion fabric regions such as the expansion fabric regions 134, 136, and 138 include regional replicas from the master fabric region 132. Such replicas thus include corresponding copies of resources, such as the remote desktop virtualization gateway 434, the remote desktop virtualization template 430, and the virtual desktop 432.

A desktop client such as the desktop client 436 can connect through to the appropriate desktop 432 regardless of location, as defined by the global pool 410, using the optimal fabric expansion regions. The optimal fabric region is selected by selection between the one of the master fabric region 132, or the replicated fabric regions 134, 136, and 138 that is the closest gateway to the location of the requesting user.

Since the cloud desktop system relies only on one master fabric region to define the desktop service infrastructure, it allows for reduced personnel and training costs to create and maintain a desktop service infrastructure. It also requires a shorter time to simply set up a single master fabric region and replicating it, thus eliminating the need to have individually configured and provisioned fabric regions to run in numerous regional datacenters.

The master fabric region relies on a hub and spoke distribution pattern that allows a single point of configuration to be automatically replicated from a single master regional datacenter to many replica regional datacenters. The cloud desktop fabric 400 combines a hub and spoke distribution pattern with the desktop service control plane 150 to simplify creation and management of the desktop service. The cloud desktop fabric 400 provides a global management view of the desktop service support for a desktop service use case across the different fabric regions of the cloud desktop fabric 400.

In this manner, an expansion fabric region can be added to a cloud desktop fabric such as the cloud desktop fabric 400 through automation. A minimum of configuration effort is required because the master fabric region always exists and acts a model for the new expansion fabric region.

It is to be understood that the cloud desktop system may be used for different user groups. For example, an engineering working pool may include resources that are heavily GPU based such as a CAD application; a finance working pool may use a desktop template that has trading floor software installed on it; and a general enterprise worker pool may use a desktop template optimized for productivity and collaboration software.

Figure 4B:
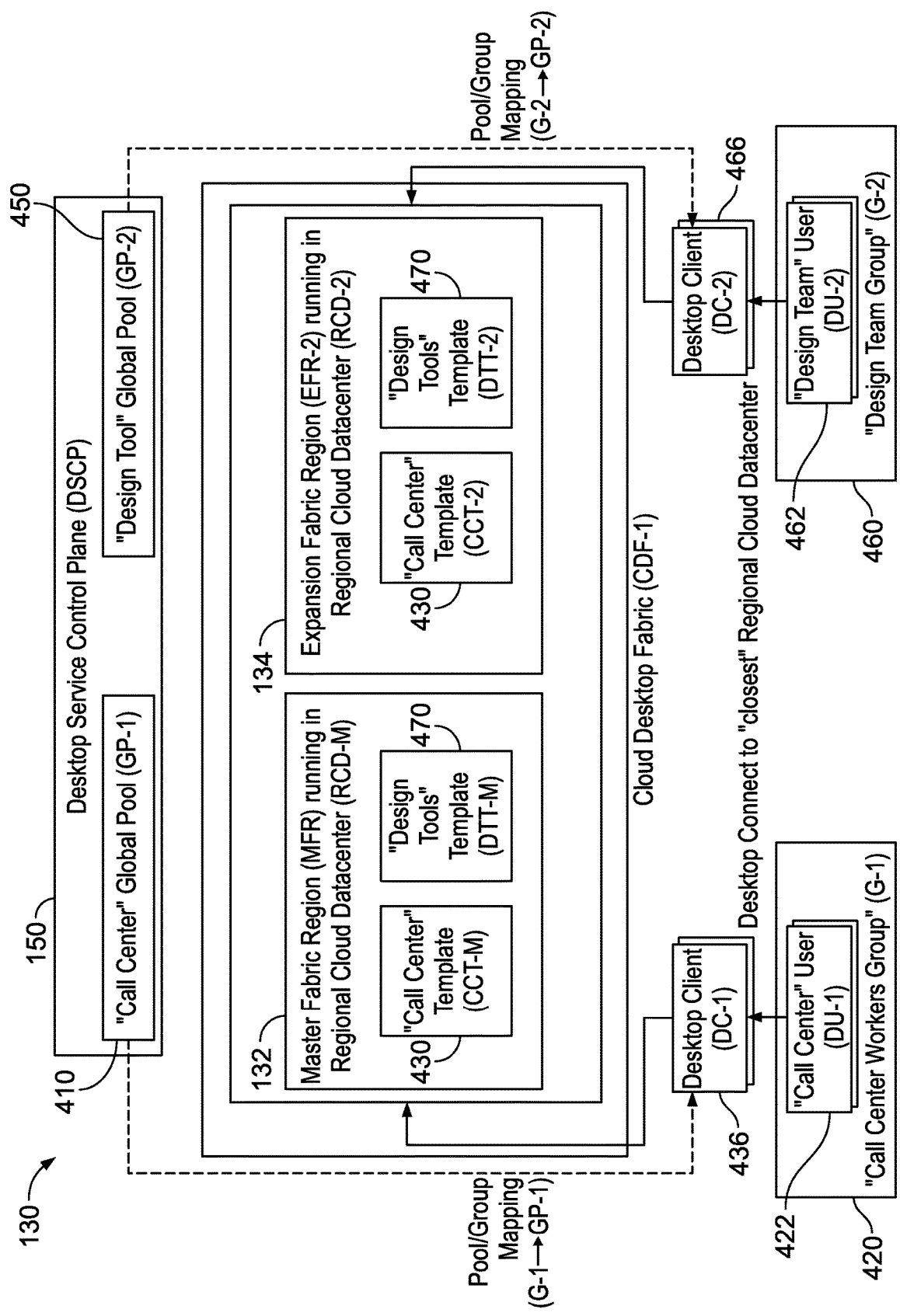
FIG. 4B is block diagram of the example cloud desktop fabric in FIG. 2 that supports multiple global pools.

FIG. 4B is another block diagram of the example fabric layer 130 in FIG. 2 that illustrates that multiple global pools can be configured to use the same fabric layer 130. In this example, the data control plane 150 has a second global pool 450 in addition to the example call center pool 410 shown in FIG. 4A. In this example, the global pool 450 is a design tool pool. In this example, a "Design Tool" group 460 includes users 462 that use design tool applications. Thus, a design tools template 470 is included in the master fabric region 132. As explained above, the example call center global pool 410 is mapped to desktop clients such as the desktop client 436 that are used by call center desktop users such as the user 422 in the "Call Center" group 420. The second global pool 450 is similarly mapped to desktop clients such as a desktop client 466 that are used by the design team users 462 in the "Design Team" group 460. The fabric regions 132 and 134 contain all the resources, such as remote desktop virtualization templates and remote desktop virtualization gateways, needed to support both global pools 410 and 450. In particular, the templates required by both global pools 410 and 450, namely the call center template 430 and the design tool template 470, are replicated to the expansion fabric region 134 from the master fabric region 132. Of course, additional pools and associated resources may be supported by the control plane 150 via the fabric regions 132 and 134.

Figure 5A:
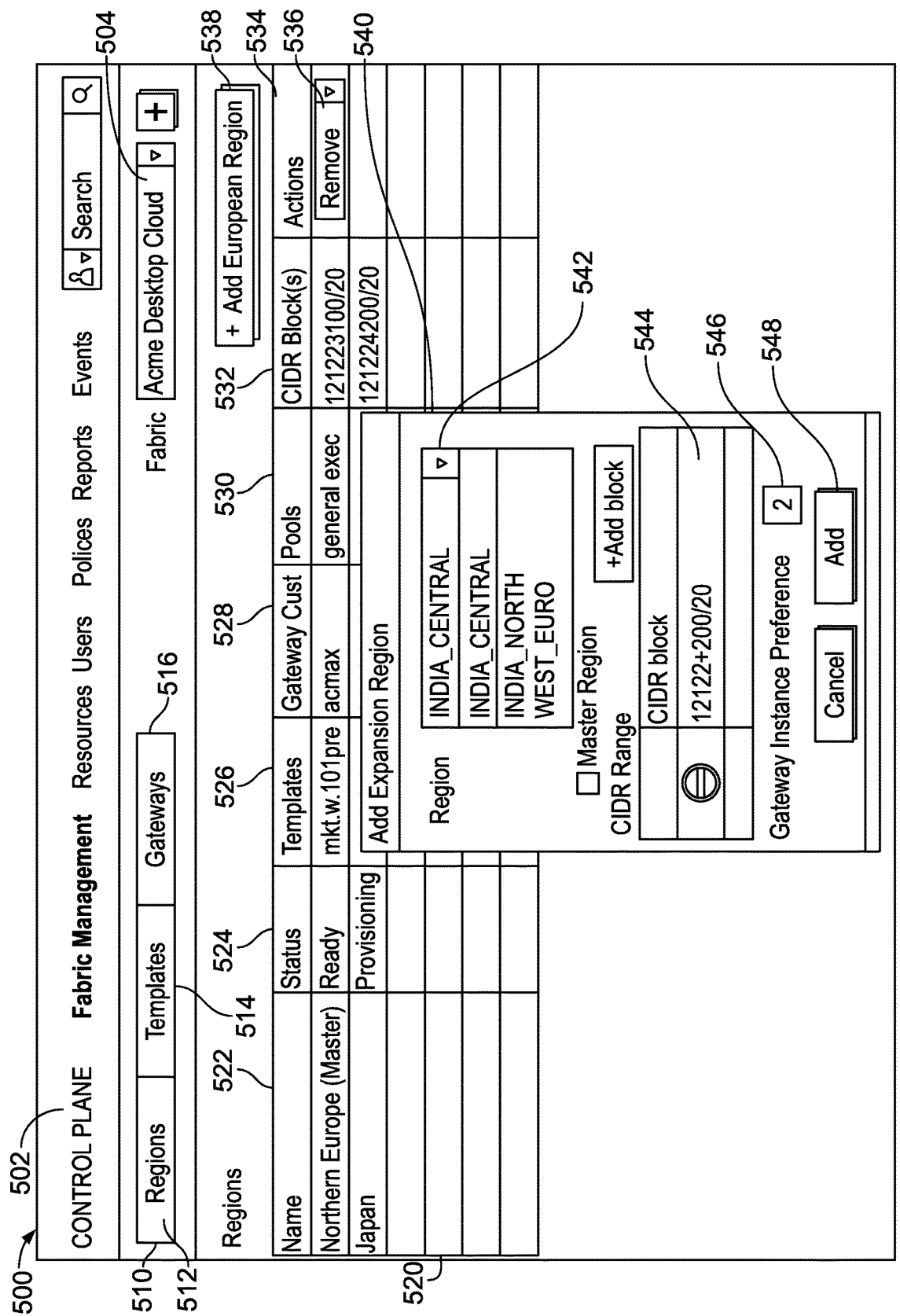
FIG. 5A is an image of an example regions interface to add additional regions to the cloud desktop fabric in FIG. 4A.

FIG. 5A is an image of an example fabric management interface 500 to manage resources for the cloud desktop fabric 400 in FIG. 4A. The example fabric management interface 500 is a user interface through the desktop service control plane 150 that manages resources for the cloud fabric 400 in FIG. 4A. The interface 500 may be generated by the configuration service 318 through the administration tool 350 in FIG. 3A.

The fabric management interface 500 has a top menu bar 502 that includes control plane, fabric regions, resources, users, policies, reports, and event selections. Each of the selections in the menu bar 502 accesses other interfaces that allow a user to perform different administrative functions, such as configuring the desktop service control plane 150 in FIG. 4A. In this example, the fabric management option is selected. The fabric management interface 500 includes a fabric selection drop-down menu 504. The desktop service control plane 150 is capable of managing a multiplicity of named cloud desktop fabrics, each of which has its own master fabric region and set of expansion fabric regions. In this example interface, the experience is simplified by setting one named fabric (in this example, "Acme Desktop Cloud") as the context for all the current management operations of a specific interface session. The fabric selection drop-down menu 504 allows the administrative user to change the current context of the fabric management interface 500 in order to work on a different cloud desktop fabric.

Figure 5B:
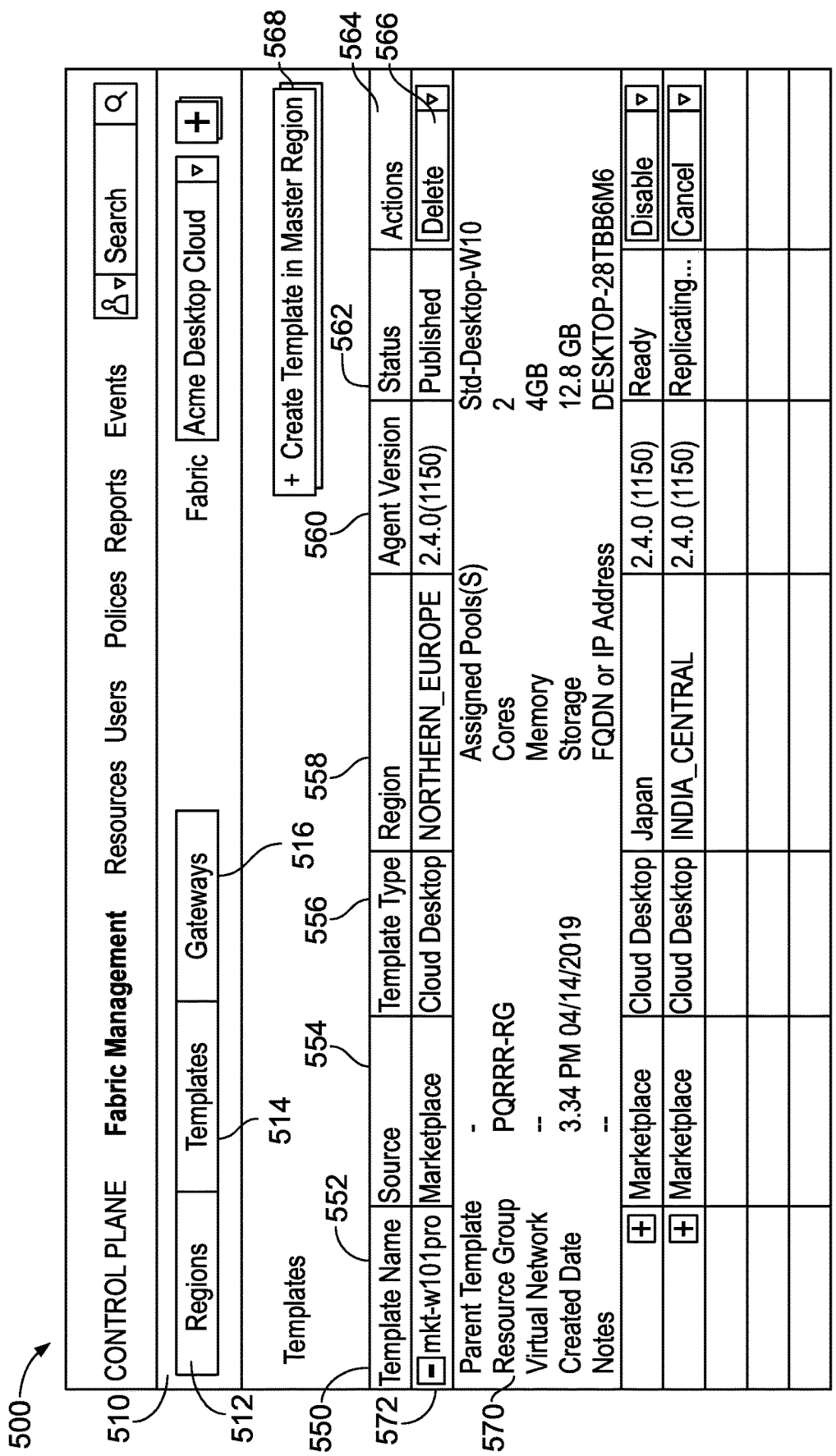
FIG. 5B is an image of the example fabric management interface showing a template interface.
Figure 5C:
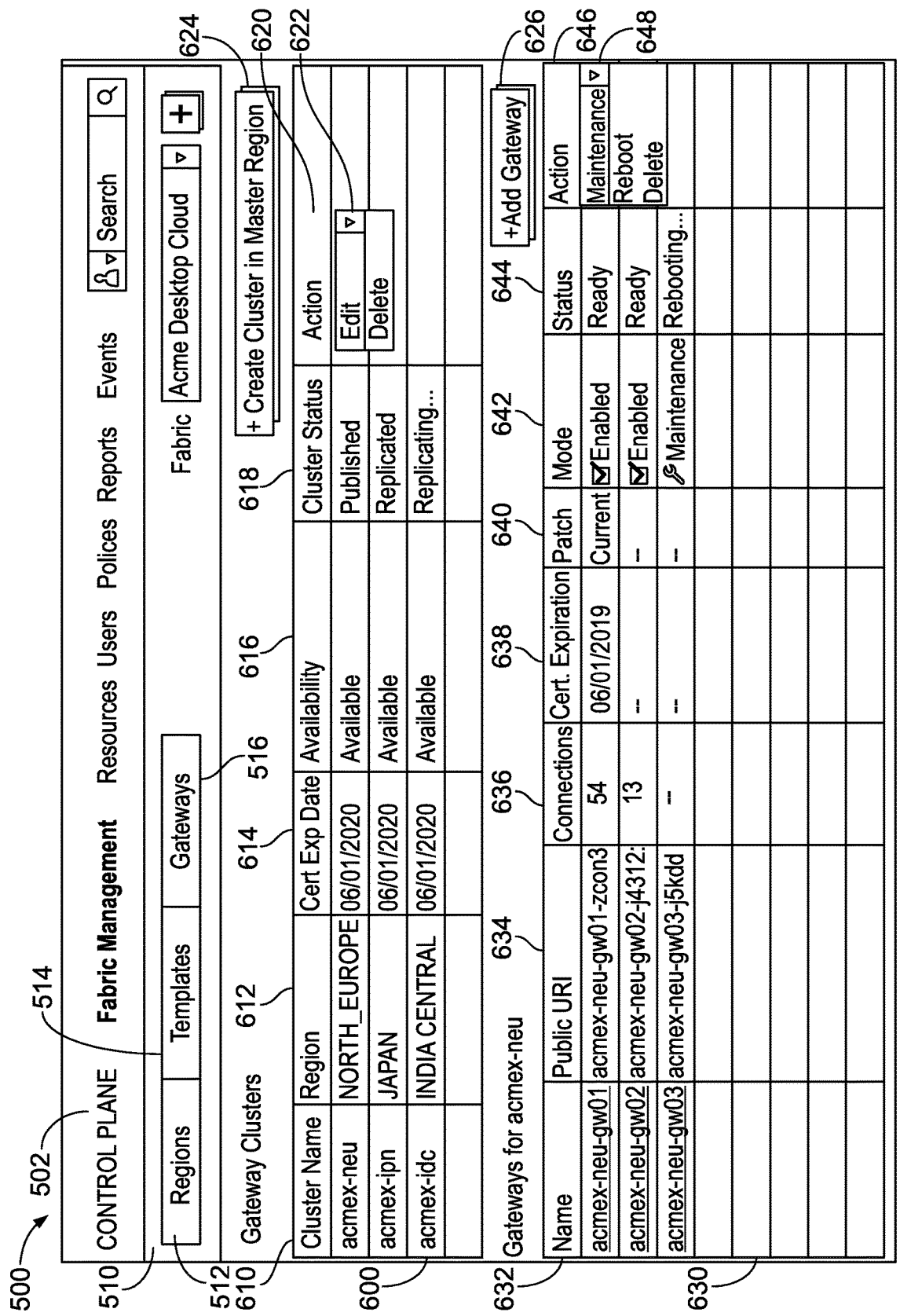
FIG. 5C is an image of the example fabric management interface showing a gateways interface.

The interface 500 has a selection bar 510 that includes a region tab 512, a templates tab 514, and a gateway tab 516 for managing different kinds of fabric resources of the currently selected fabric ("Acme Desktop Cloud"). Selecting the regions tab 512 as shown in FIG. 5A displays an interface to manage the fabric regions. Selecting the templates tab 514 displays a template interface for the creation and management of desktop templates as shown in FIG. 5B. Selecting the gateways tab 516 displays a gateways interface for the creation and management of gateways as shown in FIG. 5C.

A regions table 520 is displayed in FIG. 5A that has different information columns for each of the fabric regions, referenced as regions in this example. The regions table 520 has different columns including a name column 522, a status column 524, a templates column 526, a gateway clusters column 528, a pools column 530, a Classless Inter-Domain Routing (CIDR) blocks column 532, and an actions column 534, for each of the listed regions. The name column 522 shows the name of the region, which in this example may be a geographic name for the region. The status column 524 shows whether the region is ready or is provisioning. The templates column 526 shows the templates existing in the particular region. The gateway cluster column 528 lists the gateway or gateways assigned to the region. The pools column 530 shows the pools assigned to the region. The actions column 534 provides a dropdown menu 536 that allows a user to pause, remove, or perform other operations regarding a particular region.

This illustration assumes that a master fabric region, such as the Northern Europe region, for the cloud fabric has already been created and is operational. In this example, the master fabric region is listed in the first row of the table 520 and designated as the "Master." When resources such as gateways, templates, and pools are created within the fabric (not shown), they are initially provisioned within the master fabric region and are listed on the first row of the regions table 520.

The interface 500 includes an add expansion region button 538 that allows an administrative user to add a region to the list of the regions in the regions table 520. Selecting the add expansion region button 538 displays a pop-up window 540. The pop-up window 540 includes a region selection drop down menu 542, a CIDR block table 544, a gateway instance preference field 546, and an add button 548. The pop-up window 540 allows the administrative user to select a new regional cloud datacenter from the region selection drop down menu 542 and specify the associated CIDR block range from the CIDR block table 544. The selected regional cloud datacenter is therefore chosen to be the host for the infrastructure and desktops associated with a brand-new expansion fabric region. An option may be provided to make the selected region the master fabric region. Other properties of the region can be specified, such as the default number of gateways to be automatically provisioned in the new region from the gateway instance field 546. After the add button 548 is clicked, the new region is provisioned and will appear in the next row in the regions table 520 with the status "Provisioning" under the status column 524 while it is still being provisioned by the control plane 150 in FIG. 2.

The FIG. 5B shows the example fabric management interface 500 with the templates tab 514 selected. A templates table 550 is displayed. The templates table 550 includes a template name column 552, a source column 554, a template type column 556, a region column 558, an agent version column 560, a status column 562, and an actions column 564. The name of each available template is listed in the template name column 552. The source column 554 indicates where the template originated. The template type column 556 indicates the purpose of the template. The region column 558 displays the fabric region name of the template. The agent version column 560 displays the version number of the monitoring agent software that will be installed on a desktop using the template. The status column 562 indicates whether the template has been published to all fabric regions, is ready to use, or is currently undergoing replication. The actions column 564 includes a menu field 566 that lists different actions for a template such as deleting it, disabling it, or cancelling a replication in progress.

The templates table 550 shows information for each template in the master fabric region, listed in the template name column 552. The templates table 550 allows the master fabric region listing to be expanded to show details about the template. Furthermore, when expanded, replicated versions of the template in expansion fabric regions are shown as indented row of information.

When the templates tab 514 is selected, the interface 500 shows a create template in master region button 568. Selecting the button 568 causes a new template to be created in the master fabric region and eventually be available for replication to other fabric regions. Selecting an expansion button 574 next to the name of the template in the template name column 522 has the effect of expanding the table row to display an expanded template information panel 572. The panel 572 lists additional information relating to the listed template such as the parent template, resource group, virtual network creation date, assigned pools, cores, memory, storage, FQDN or IP address, and notes. The expanded panel 572 may be hidden by selecting the expansion button 574 when the panel 572 is displayed.

FIG. 5C shows the example interface 500 with the gateways tab 516 selected.

A gateway clusters table 600 is displayed. In this example, the gateway clusters table 600 shows the status of gateway clusters in three different fabric regions. In this example, a gateway cluster in a fabric region named "NORTHERN EUROPE," which is the master fabric region in this example, is selected. The gateway clusters table 600 includes a cluster name column 610, a region column 612, a certification expiration data column 614, an availability column 616, a cluster status column 618, and an action column 620. The cluster name column 610 lists the unique name of each cluster. The region column 612 displays the fabric region name of the cluster. The certification expiration data column 614 displays authentication certificate information about the cluster. The availability column 616 displays the availability status of the cluster. The cluster status column 618 displays whether the cluster has been published and therefore replicated to all fabric regions in the cloud desktop fabric. The actions column 620 allows the user to take various actions in relation to a cluster via a drop down action menu 622. The actions include publishing, editing, or deleting the cluster.

The interface 500 depicted in FIG. 5C includes a create cluster in master region button 624 that allows an administrative user to add a new cluster to the master fabric region in the clusters table 600. The master fabric region would then have multiple clusters defined. In this example, the clusters table 600 shows there is a single cluster, "acmexneu," in the master fabric region, which is the typical case and it is depicted as currently selected. The interface 500 depicted in FIG. 5C also includes an add gateway button 626 that allows an administrative user to add a new gateway to the selected cluster in the table 600.

The interface 500 depicted in FIG. 5C also includes a gateways table 630 that shows details about each remote desktop virtualization gateway defined as part of the currently selected cluster "acmex-neu" in the cluster table 600. The gateways table 630 includes a name column 632, a public URI column 634, a connections column 636, a certification expiration column 638, a patch column 640, a mode column 642, a status column 644, and an action column 646. The name column 632 lists the unique name of each gateway host. The public URI column 634 lists the URI that is used as connection information for desktop clients. The connections column 636 displays the number of currently connected desktop clients for each gateway. The certification expiration column 638 shows the individual expiration date of the certificate used for authentication for the gateway. The patch column 640 shows the current operating system patch level on the host machine for each gateway. The mode column 642 shows whether or not the gateway is allowed to accept current connections. In this example, the mode column 642 may display an enabled icon or a maintenance icon indicating the mode of the gateway. The status column 644 shows whether the gateway is in a normal operating state, is rebooting, or has failed. The action column 646 allows the user to perform various actions on a gateway by selections in a pulldown menu 648. The options include rebooting the gateway, putting the gateway in maintenance mode, and deleting the gateway.

The example cloud desktop fabric 400 in FIG. 4A is a flexible way of providing cross-region access to a desktop service. As explained above, the cloud desktop fabric 400 is created by designating the different region fabrics via the desktop service control plane 150. The cloud desktop fabric 400 is thus created and managed by a desktop service control plane 150. The cloud desktop fabric 400 combines a logical model of the desktop service with the hub and spoke distribution paradigm, to dynamically extend desktop services across multiple fabric regions.

Figure 6:
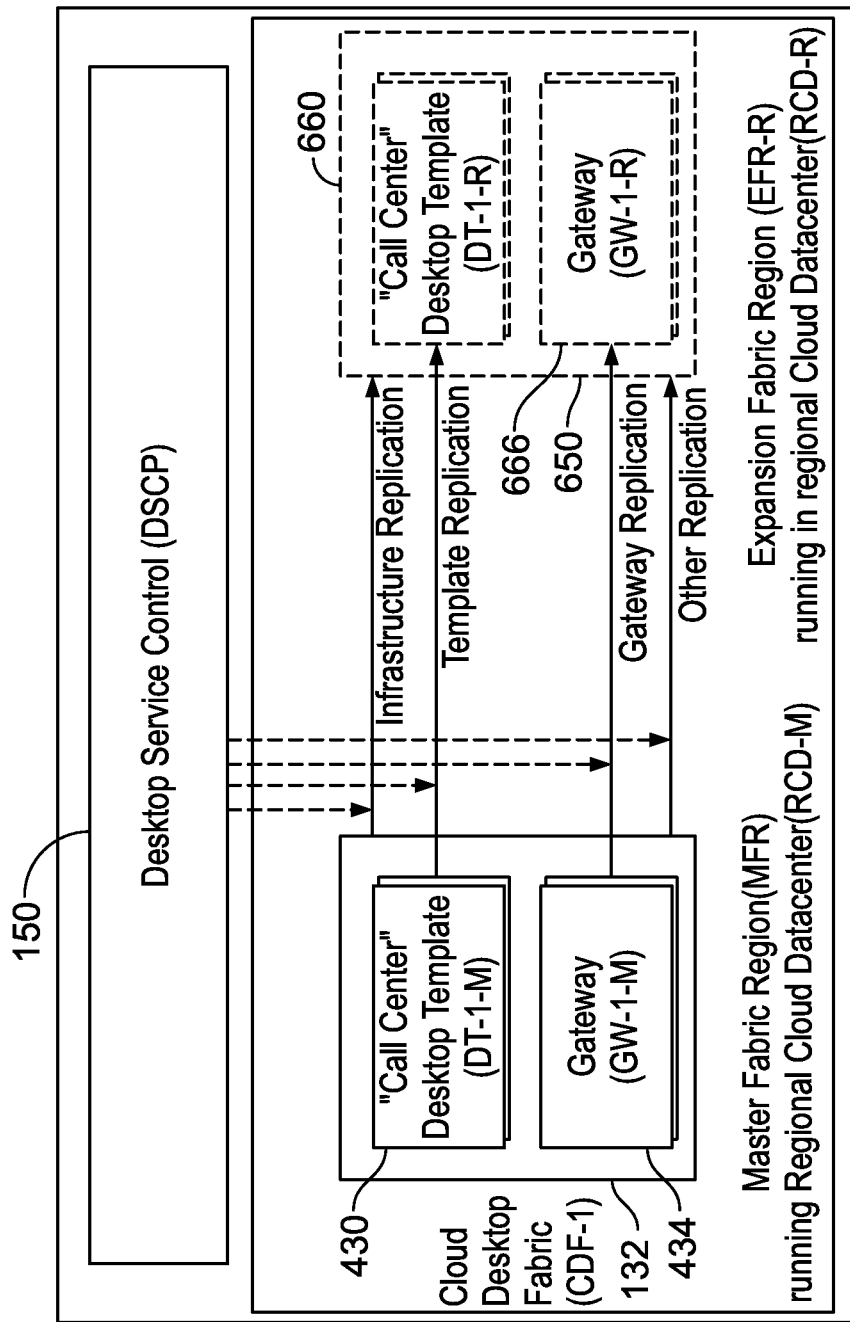
FIG. 6 is a block diagram of the process of adjusting the size of the example cloud fabric by adding an expansion region fabric in the cloud desktop fabric in FIG. 2.

FIG. 6 is a block diagram showing the process of expanding the cloud desktop fabric 400 in FIG. 4A. As explained above, the desktop service control plane 150 creates and manages the master fabric region 132. In this example, the fabric 400 is extended to include an additional expansion fabric region 650 running in a regional cloud datacenter to accommodate additional users. This is achieved by managing regional replicas of all required desktop service resources. For example, in FIG. 6, there are four resources replicated: 1) the network infrastructure (possibly including virtual network and virtual storage); 2) one or more desktop templates; 3) one or more gateways; and 4) other regional replicas as may be required. The regional replicas such as the replica fabric region 650 include the infrastructure of the expansion fabric region itself and desktop resources including, for example, a desktop template 660 and a replicated gateway 666. Examples of other infrastructure that may be replicated may include storage accounts, connection brokers, or network settings.

The expansion fabric region 650 allows users in the region that belong to a pool, such as global pool 410 in FIG. 4A, to quickly access resources such as a desktop based on the replicated desktop template 660. As shown in the process in FIG. 6, the fabric includes the management of any required components for a desktop service. It is to be understood the system in FIG. 6 is an example, and other components, infrastructure, and working groups may be included. The creation of a fabric can be of any size, and is not limited to the two fabric regions shown in FIG. 6. Other cross-regional infrastructure may be created in the master fabric region 132. Such infrastructure may include an enterprise connector, and other components that may only need to exist in a single regional cloud datacenter.

The master fabric region 132 may be created by end-to-end scripting of the APIs of the cloud required to create desktop service support in a single fabric region. The designation of the master fabric region 132 serves as the home of infrastructure or other global resources (required in only one region). This category includes, but is not limited to, an enterprise connector. The designation of the master fabric region 132 serves as an infrastructure template for desktop service resources that will be replicated to expansion fabric regions such as the expansion fabric region 650.

Alternatively, desktop service resources may be replicated to other expansion fabric regions by automated operations. Further, a brand-new fabric region may be fully or partially provisioned by automated operations. Automated operations may also completely remove an expansion fabric region that is no longer needed. Automated operations may create regional replicas of desktop service resources from the master fabric region 132 to instantiate a new expansion fabric region.

An agent program may be installed on each monitored desktop service resource for supervisory purposes. The agent program collects key data about activity in the infrastructure, including connections, memory usage, and average network latency. The agent program may also be used to detect that the infrastructure is no longer responding on the network. The key data is used to monitor and troubleshoot problems that could occur anywhere in the cloud desktop fabric 400. Furthermore, the agent program supports remote operations such as reboot and supporting maintenance operations that are directed by the desktop service control plane 150.

In this example, the desktop service resources are managed in clusters and therefore the capacity for the resources is scalable. The desktop service control plane 150 can easily create, adjust, or delete desktop service resources in any or all of the fabric regions in the cloud desktop fabric 400.

Information about the demand for virtual desktop connections is constantly collected, including the physical location of users, the quality of the network they are using, and the actual Round-Trip-Time (RTT) or network latency they are experiencing. The desktop service control plane 150 already has information about the requirements of the connection performance. This aggregated information can be used to infer when adding support for additional expansion fabric regions is required. This information may be used to trigger the region-provisioning operation automatically in the desktop service control plane 150.

Treating regional access as a configuration detail, instead of the primary focus of human configuration activities, dramatically reduces the number and complexity of work required to set up expansion fabric regions for a single desktop service use case. This leads to lower costs and faster ramp up time for both new customer and expansion of the usage by existing customers.

The flexibility of the cloud desktop fabric 400 dramatically shortens the time it typically takes to expand desktop service into a new region. Furthermore, it shortens the time it typically takes to adjust the desktop service offering by adding new desktop service resources required for a desktop service including but not limited to gateways, desktop templates, and service brokers.

The example cloud desktop fabric makes it feasible to manage and scale a cloud desktop service for user groups having a footprint of users that may be geographically distributed to a high degree. The desktop service control plane can automate routine operations, such as expanding and contracting desktop services, optimize operational efficiency, and provide a uniform and reliable experience using a desktop service.

Figure 7:
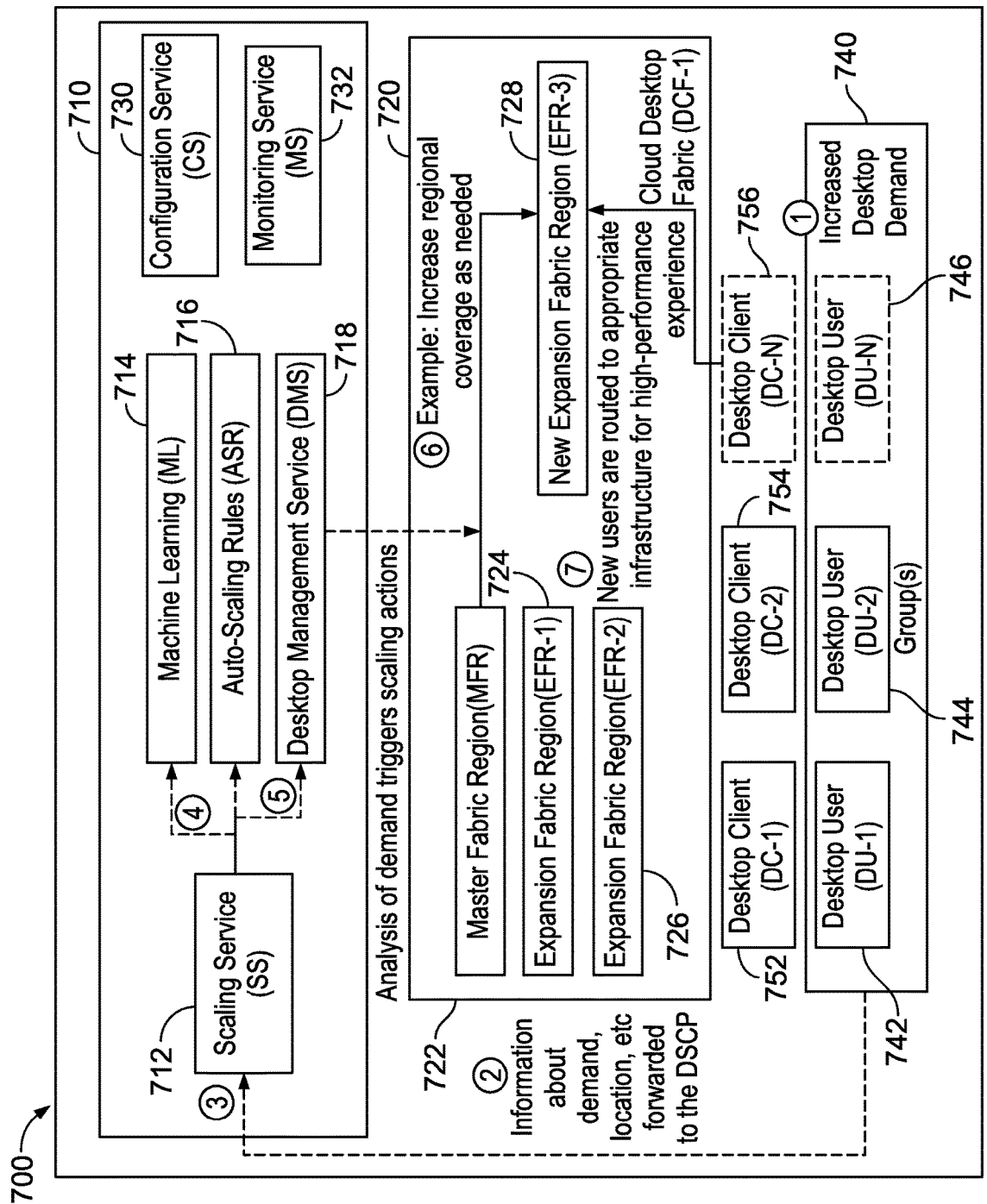
FIG. 7 is a block diagram of the process of automatically expanding the size of an example cloud desktop fabric by adding an expansion fabric region.

FIG. 7 shows a block diagram of a process to automatically expand or shrink another example cloud desktop service architecture 700. The automated architecture 700 includes a desktop service control plane 710 and a cloud desktop fabric 720 similar to the cloud desktop fabric 400 in FIG. 4A. Thus, the cloud desktop fabric 720 includes a master fabric region 722, and expansion fabric regions 724 and 726. As explained above, the cloud desktop fabric 720 includes resources for different working pools such as a virtual desktop interface gateway, a virtual desktop template, and virtual desktops. The example cloud desktop fabric 720 automatically expands or shrinks inside a region, or the regional coverage, in response to user demand. As an alternative to an administrative user adding or eliminating regional fabrics for the cloud fabric 400 in FIG. 4A via an API for the control plane 150, the fabric 720 in FIG. 7 may be configured to automatically perform these functions. In this example, the control plane 710 associated with the cloud desktop fabric 720 includes built in automated logic, and therefore can leverage auto-scaling techniques in the realm of desktop service. The desktop service control plane 710 thus includes a scaling service module 712, a machine learning module 714, an auto-scaling rules (ASR) module 716, and a desktop management service module 718. The desktop service control plane 710 also includes a configuration service 730 for configuring new resources or new fabrics as will be explained below. The control plane 710 also includes a monitoring service 732 that collects data from the operation of the resources of the fabric regions in the cloud desktop fabric 720.

The architecture 700 services a user group 740. In this case, the user group 740 includes multiple users such as the users 742 and 744. Each of the users 742 and 744 may be geographically distant from each other. Each of the users 742 and 744 access the virtual desktop in the respective associated fabric region, which may be selected from the master fabric region 722, or the expansion fabric regions 724 and 726 via a respective desktop client 752 and 754. As explained above, the architecture 700 may support multiple user groups similar to the user group 740.

The scalability of the example cloud desktop fabric 720 applies at the granularity of an entire fabric region. One such example scenario to expand into a region is shown in FIG. 7. In this example, one or more new desktop users such as a new desktop user 746 are added to the system, increasing demand. Information is forwarded to the desktop service control plane 710 relevant to the new demand, including the location of the new user 746, or any other relevant facts, for example, the quality of the network connection of the desktop client to a local network, or the service level agreement that governs the performance expectation of the new user 746.

The scaling service module 712 analyzes the current and the new demands, and the relevant performance data, using various known techniques including combined techniques. In order to select the optimal fabric region, the scaling service module 712 considers various types of network proximity (the shortest network latency, or delay of each interaction provided by a desktop virtualization protocol connection). One measure could be the proximity of the local network of the desktop user 746 to the candidate fabric region's gateway, known as "gateway proximity." Another could be "desktop proximity" or the ability of the remote desktop to efficiently access its own data resources or other dependent services that may reside on other networks. When combined, these two types of proximity give a strong prediction of acceptable user experience. Additional factors, such as the cost of different network connections, could also become factors in evaluating the candidate fabric region against the existing fabric regions. The scaling service 712 can therefore predict whether or not an additional fabric region may be needed to service connection requests.

For example, the scaling service module 712 may use machine learning (ML) techniques executed by the machine learning module 714 to devise a plan for expanding or contracting the cloud fabric 700 in order to optimize its use. The machine learning may use previous inputs such as user traffic to predict future times of user activity and automatically expand and contract the cloud fabric by adding or deleting expansion regions based on the predicted use. In addition, based on recent usage, machine learning may predict that a new, closer region based on network proximity is likely to reduce the network latency and reduce the number of performance complaints. Machine learning may be able to predict which fabric region would result in fewer service complaints for a particular user, or predict how to optimize costs as well as optimize user experience by considering billing data.

The scaling service module 712 may apply rules, such as the automatic scaling rules 716, to utilize these factors to inform the action plan. For example, if the predicted network proximity of the candidate existing fabric region may not provide optimal performance, based on the service level agreement with the customer, the location of the data center may be designated as part of a candidate infrastructure hosting plan for provisioning a new expansion fabric region. Other rules about costs and benefits of the expansion can be evaluated.

Depending on the outcome of the analysis, the desktop management service 718 may provision an expansion fabric region 728 with a full set of infrastructure and desktop service resources of its own, to handle the increased demand. A new desktop client, such as the desktop client 756, can now be routed to the new optimal fabric region 728.

Shrinking from a region involves a similar process. Shrinking a region may be triggered by conditions such as a lack of use by desktop users, and thus an expansion region may be destroyed. For example, the rules around automatically destroying a fabric region might be: a) a rule of prohibiting removal of a fabric region currently in use; b) a rule prohibiting removal of the master fabric region; c) a rule checking for unused fabric regions within a particular time period; and d) a rule requiring operator intervention before removing a fabric region.

Furthermore, the cloud desktop fabric 700 may make adjustments for each fabric region individually. For example, the optimal number of gateways in a gateway cluster available may be adjusted as may be the loads of each fabric region.

Figure 8:
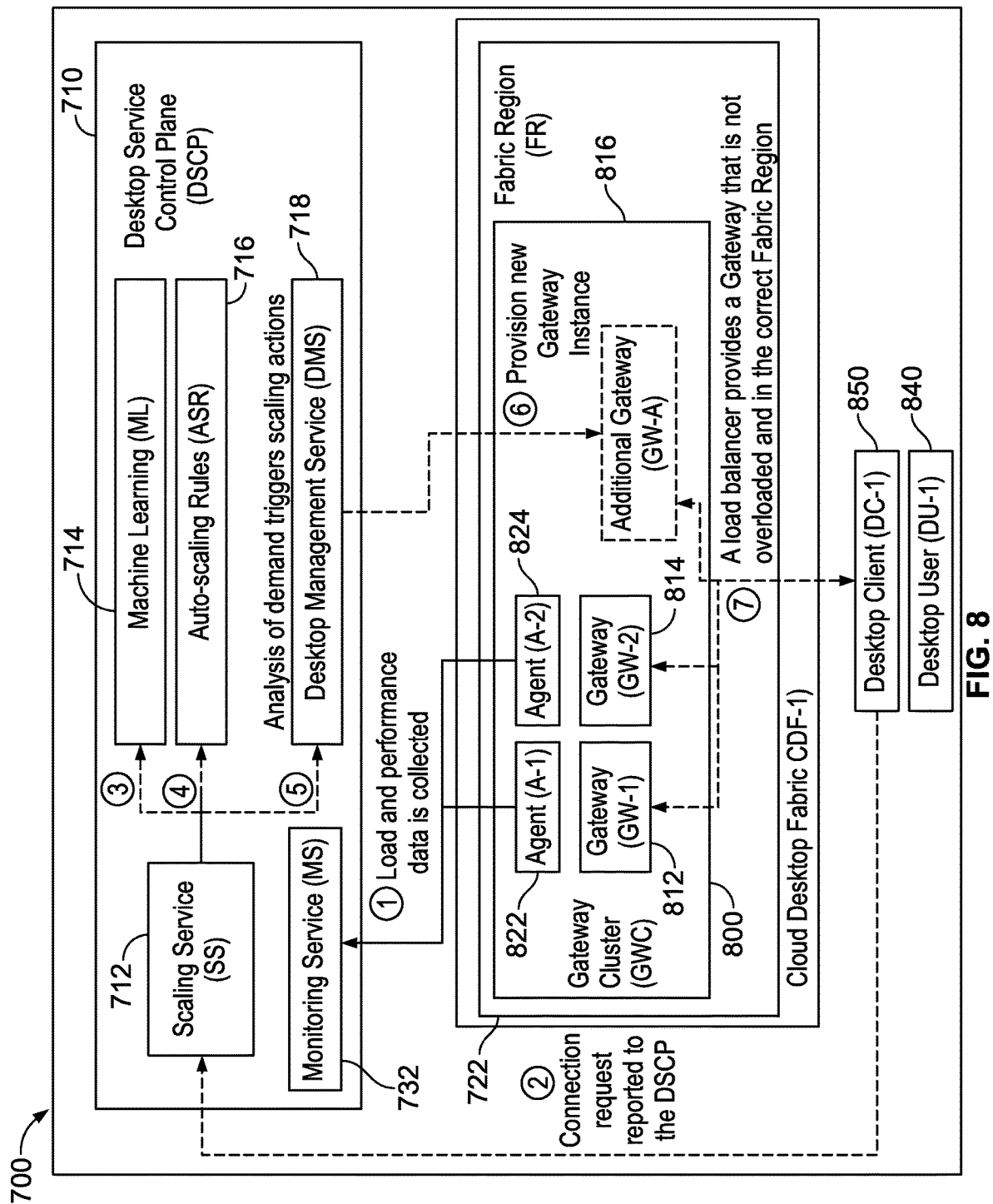
FIG. 8 is a block diagram of the process of adjusting resources in an expansion fabric region in the example cloud desktop fabric in FIG. 7.

The example system allows adjusting resources in a region such as gateways. FIG. 8 shows the process of self-adjusting to expand within a region in the architecture 700 in FIG. 7. In this example, the fabric region 722 includes a gateway cluster 800 that includes gateways 812 and 814, and respective agent programs 822 and 824. As shown in FIG. 8, an example desktop client 830 may access either of the gateways 812 and 814 for a requesting user 840. It is to be understood that any of the fabric regions 722, 724, and 726 in FIG. 7 may be adjusted by this process.

The process of adjusting a region may be through the below described routine. First, the gateway agents, such as gateway agents 822 and 824, provide a stream of data to the monitoring service 732 in the desktop service control plane 710 that allows the desktop service control plane 710 to be aware of the load conditions on all the gateway clusters, such as the gateway cluster 800, in all fabric regions such as the fabric regions 722, 724, and 726. Whenever a desktop client, such as the example desktop client 850, attempts to connect to a desktop, the desktop service control plane 710 is informed. Thus the desktop service control plane 710 is aware of which desktop clients are connected to which gateways. The scaling service 712 analyzes the current and new demands and performance data, using various known techniques, including combined techniques. For example, the scaling service 712 considers the number of connections serviced by each gateway in a particular fabric region, or the utilization level of the memory and CPUs of the gateway.

For example, the scaling service 712 may use machine learning (ML) techniques executed by the machine learning module 714 to devise a plan for expanding the fabric. For example, based on recent usage, the trend may be indicating that demand for a particular gateway cluster such as the gateway cluster 800 is growing (or shrinking), as a prediction. The scaling service 712 may apply the auto-scaling rules 718 to utilize these factors to inform the action plan. Some example rules include rules about cost and benefit of the expansion can be evaluated.

Depending on the outcome of the analysis, the desktop management service 718 may expand the size of the gateway cluster by instantiating a new gateway, such as the gateway 816, to handle the increased demand. Alternatively, the desktop management service 718 can place lightly used gateways in a maintenance mode (not accepting new connections) and schedule them to be removed automatically.

The desktop clients, such as the desktop client 850, thus are routed to a gateway from the now available gateways 812, 814, and 816, that is able to handle the load properly, and the size of the gateway cluster is optimal for the current conditions.

The desktop service control plane 710 has the ability to resize any kind of desktop service resource, thereby easily adjusting the capacity of the cloud desktop fabric 720 where it is needed, either increasing or decreasing the fabric as needed. The desktop service control plane 710 can manage down-scaling to avoid disruptions to customers (for example, it can orchestrate the draining of connections to a service before removing the service). This information can be used by the machine learning module 714 to predict where resources need to be added, or where they can be removed to optimize resources.

This information can be combined with rules or other logic to implement policy-driven patterns. All information sources can be combined together for optimal resize operations within a region.

The capability to automatically adjust fabric regions 722, 724, and 726 in FIG. 7 to enable faster, more proactive actions to be taken in a large system, allows the human operators to focus on optimizing the system rather than performing rote tasks or manual playbooks in relation to resource allocation and fabric changes.

Figure 9:
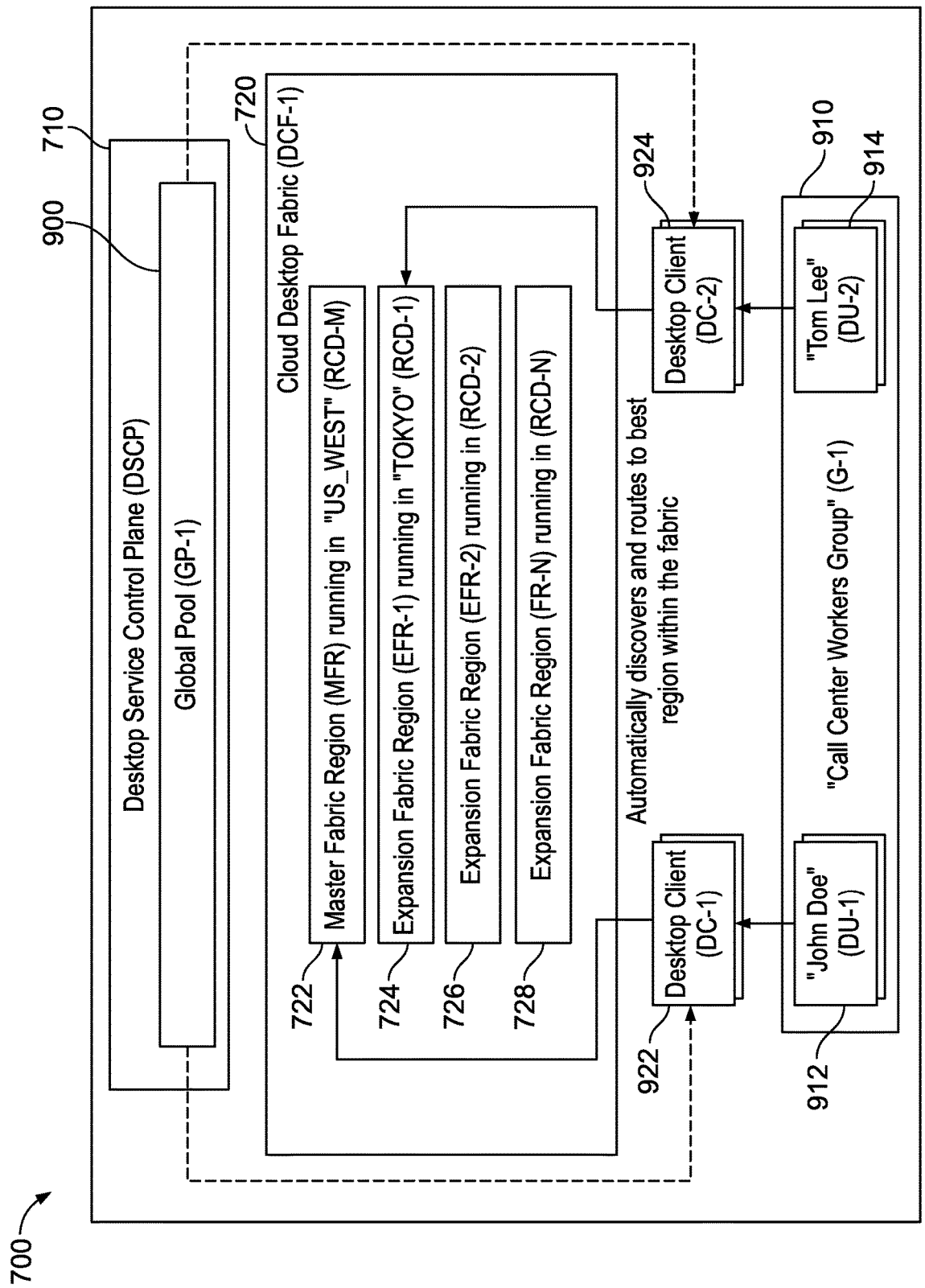
FIG. 9 is a block diagram of the process of providing desktops in the example cloud desktop fabric in FIG. 7.

The system may also optimize placement of desktops in the cloud desktop fabric. FIG. 9 shows an example of the process of placement of the desktops in the architecture 700.

The example cloud desktop fabric 700 allows high-performance desktop experiences to be easily created for users across multiple regions of the world. The system allows desktops placed on the fabric to deliver optimal performance to users.

The cloud desktop service architecture 700 in FIG. 9 allows desktop users with the same computing needs, who are based in different geographic locations, to be allocated a desktop based on the same desktop templates, even though the users are accessing the desktop through different regional cloud datacenters. FIG. 9 shows the cloud desktop fabric 720 in FIG. 7 with multiple fabric regions 722, 724, 726, and 728 with a global pool 900 in the control plane 710.

In this example, a single workers group 910 may be labeled a "Call Center Workers Group." The group 910 includes two desktop users 912 and 914 that are widely dispersed geographically. The cloud desktop fabric 720 provides access to all of the fabric regions 722, 724, 726, and 728. Each of the expansion fabric regions 724, 726, and 728 have desktop resources such as desktop templates and gateways that are regional replicas that provide the same functionality.

When a user requests access to their desktop resource in the cloud desktop fabric 720, the desktop for the user is selected for optimal performance. In this example, the performance characteristics of a desktop for a desktop user depends on a complex set of conditions including latency and bandwidth of network connection between desktop user and the desktop. These conditions are evaluated in order to assign a desktop to the user that delivers the optimal performance.

In this example, the user 912 is located in San Francisco, Calif., which has the best network proximity to the master fabric region 722 located in a regional cloud datacenter called "US_WEST" (RCD-M). Another user 914 is located in Osaka, Japan, and has the best network proximity to the expansion fabric region 724 located in the regional cloud datacenter called "JAPAN" (RCD-1).

Although the two desktop users 912 and 914 use their own respective desktop clients 922 and 924, respectively, each uses the same global pool 900. Because the global pool 900 is defined within the cloud desktop fabric 720, each user is allocated a desktop provisioned from identical desktop templates in either the master fabric region 722, or the expansion fabric region 724 that is replicated from the master fabric region 722.

The example cloud desktop fabric 720 extends the concept of the regional pool to become a global pool. In this example, the cloud desktop fabric 720 optimizes the network proximity of the desktop user to the virtual desktop. When a non-persistent desktop user is assigned to a global pool, the administrator, with the help of the desktop service control plane 710, can utilize the current physical location of the user to optimize what part of the fabric will be accessed.

When a persistent desktop user is assigned to a global pool such as the global pool 900, the administrator may use the desktop service control plane 710 to use the usual physical location of the user to optimize what part of the fabric will be accessed.

Further, the desktop service control plane 710 maintains information globally about the demand loads and response times on requests for desktop service resources over all the expansion fabric regions run by all the datacenters. This information can be used by machine learning systems such as the machine learning module 714 to predict where resources need to be added, or where they can be removed to optimize resources.

This information can be combined with rules or other logic to implement policy-driven patterns. All information sources can be combined together for optimal resize operations within a region. The disclosed cloud desktop fabric enhances a desktop service to make it highly available to desktop clients located anywhere in the world, with the performance that comes with the highest degree of network proximity. This means that because of physical distance, and number and quality of network connections, the performance of the user experience is optimized.

The use of the example cloud desktop fabric makes it possible to efficiently deploy highly network-bound desktop service use cases anywhere in the world. For example, these can include those using virtualized Graphical Processing Unit (GPU) rendering, such as Computer-Aided Design (CAD) applications used in the automotive, engineering, and construction industries. In many cases this difference in performance is a key factor in determining the usability of the desktop service solution.

The system also allows a desktop for a user to be migrated anywhere within the system. This could be required because the user is physically moving locations. It can also be required because an upgrade to their desktop virtual machine type requires them to be connected to a different regional cloud datacenter supporting the new virtual machine type. Thus, a user may connect to their desktop from anywhere in the world via the cloud desktop fabric. This solves the problem of current desktop services, where users are assigned to a specific regional cloud datacenter and must continue to access the datacenter through a peer-to-peer network or some WAN even though another datacenter may be in closer network proximity.

There are two different kinds of desktop users that can be affected by migration to different regions. Non-persistent desktop users get a fresh desktop every time they start a session. A travelling user may leverage the global pool capability of the cloud desktop fabric 720 to easily provide the desktop from any location. Persistent desktop users present more of a challenge because they are allocated a dedicated desktop that stores their preferences, data, registry, installed applications, and so on. They expect this experience to follow them as they relocate, much as a personal laptop computer does.

To implement a migration of a non-persistent desktop, the desktop management service 718 of the example fabric system architecture 700 can take advantage of the replicated resources, and global pool mechanism already described for the cloud desktop fabric. Because there is no state to be preserved or transferred, it is sufficient to wait until the user's current session ends, then simply decrement the size of the regional pool in the original fabric region 722, and increment the size of the corresponding regional pool in the migration target fabric region 724.

A non-persistent desktop user can easily re-connect from a different region, but because they are already members of a group mapped to the same global pool, the fresh desktop can be provided from a regional cloud datacenter with a high degree of network proximity to the location of the user.

A persistent desktop user can have their desktop migrated between fabric regions easily, from an original fabric region to a migration fabric region, because the underlying infrastructure and desktop resources are already in place for all fabric regions. Once the migration occurs, the user can access the desktop from a regional cloud datacenter with a high degree of network proximity.

Figure 10:
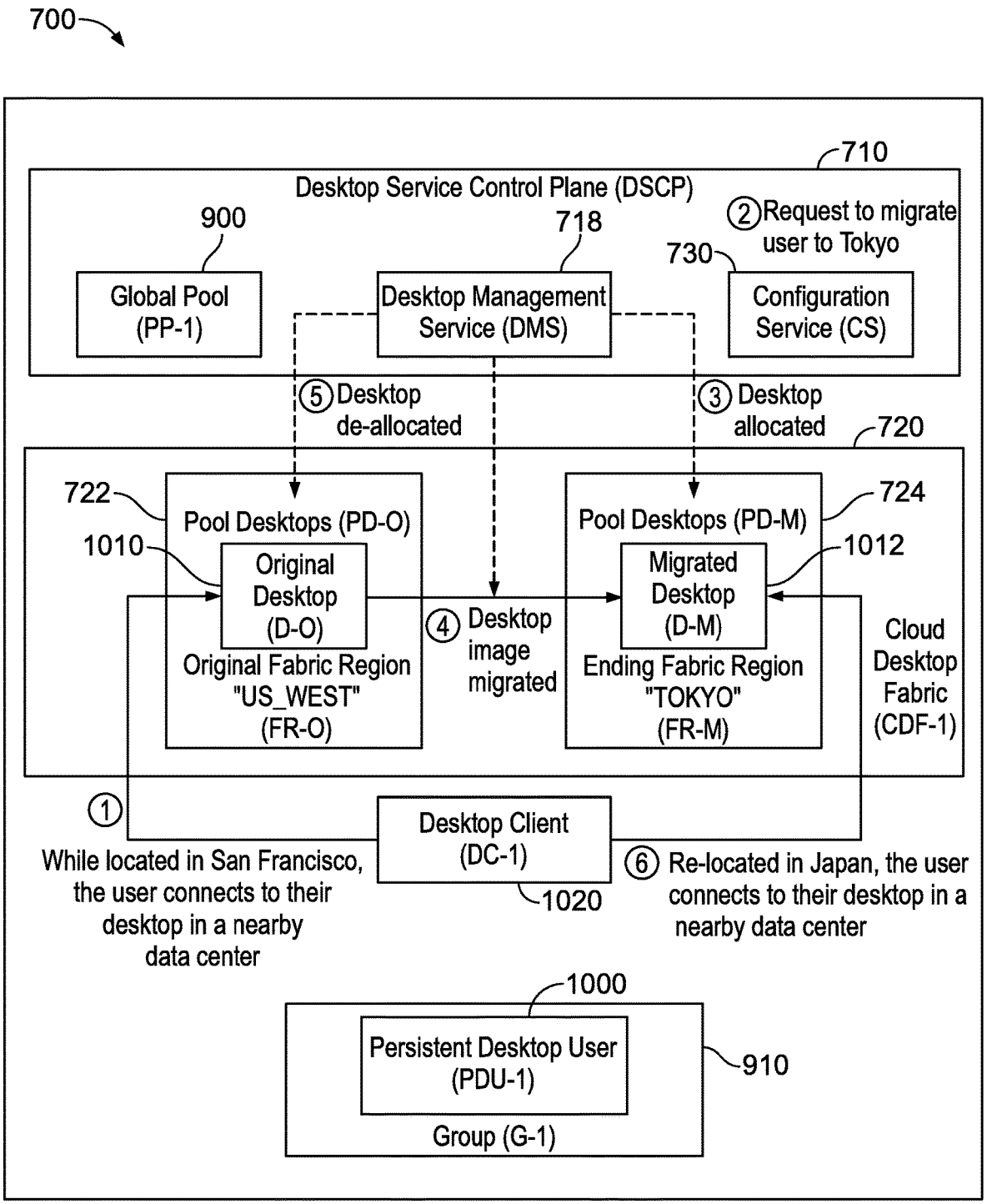
FIG. 10 is a block diagram of the process of migrating a desktop of a user to a different fabric region in the example cloud desktop fabric in FIG. 7.

FIG. 10 shows the process of migrating the desktop of a persistent desktop user in the architecture 700 in FIG. 7. In this example, a user 1000 ("John Doe") in the group 910 has an assigned dedicated persistent desktop 1010. Thus, the user 1000 has used and customized the desktop, as well as stored files and other settings on it. The desktop may have additional software installed on it. The global pool 900 associates the user 1000 with the fabric region 722 ("US WEST") in this example. Thus, a desktop client 1010 of the user 1000 accesses the persistent desktop hosted by the fabric region 722 on the "US WEST" regional cloud datacenter.

The configuration service 730 becomes aware that persistent desktop user 1000 is relocating to Osaka, Japan, whose nearest fabric region 724 is the "TOKYO" fabric region. In this example, the configuration service 730 may become aware of the relocation through automatic detection of location from a new sign on from the new location by the user 1000 or through other workflows such as a change management request generated by a corporate service desk.

The relocation triggers the desktop management service 728 to allocate a desktop 1012 within the pool desktops of the fabric region 724 for "TOKYO." The desktop is migrated to the new fabric region 724. This can occur using one of several routines. For example, the original desktop 1010 is powered down in the original fabric region 722 ("US WEST"). A snapshot of the disk of the original desktop 1010 is made using cloud provider APIs. The disk image is copied into storage in the migration fabric region 724 ("TOKYO"). The disk is then re-activated as part of the pool desktops in the fabric region 724 and becomes the desktop 1012. Any other network initialization required by the change of network, such as a change of IP address, can be automatically performed.

The original desktop 1010 is de-allocated from the original pool desktops in the original fabric region 722. When the user 1000 logs in again, in Osaka, the desktop client 1020 connects to the migrated desktop 1012 now hosted in the local regional cloud datacenter "TOKYO" as part of the fabric region 724 for "TOKYO."

The desktop service control plane 710 maintains information about desktop users in the global pool 900. The users include persistent desktop users, and can implement the correct policies to allow a desktop user to migrate to another part of the world. The configuration service 730 can orchestrate the desktop management service 718 to manipulate pool desktops in any fabric region such as the fabric regions 722, 724, 726, and 728.

The cloud desktop fabric 720 ensures that a desktop can migrate from one fabric region to another because all operations are already automated, and underlying infrastructure and desktop services (including gateways and desktop templates) are already present. Migration is achieved using IaaS capabilities that power machines up or down, snapshot their images, push large files between regions, and cause automation scripts to run on the machines. The desktop service control plane 710 along with the agent 334 depicted in FIG. 3A can handle re-registration of the desktop in a different regional network.

Thus, desktop users may use a desktop service with a high-level of performance without worrying about their physical location. Migration of a desktop between fabric regions is especially valuable for persistent desktop users because it avoids the cumbersome steps needed to accomplish the migration without the example cloud desktop fabric.

Figure 11:
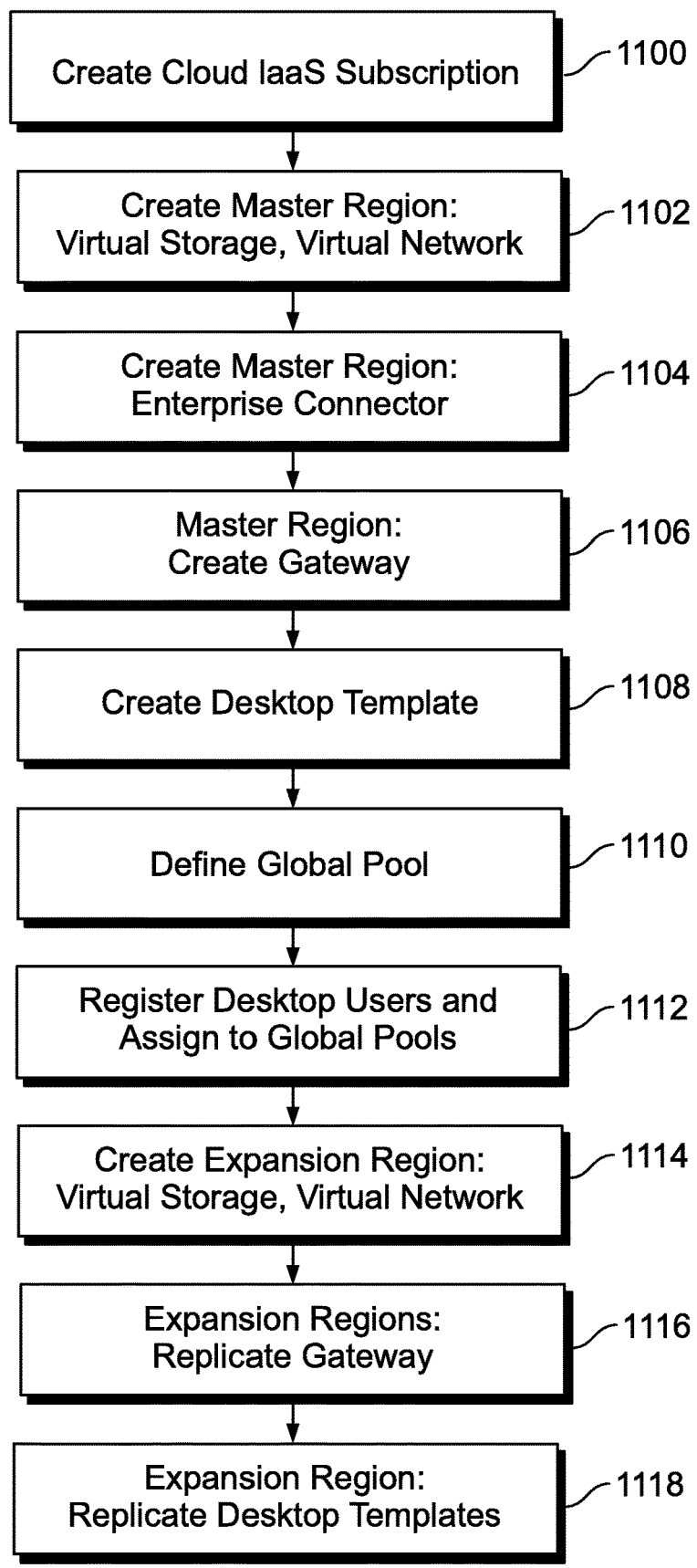
FIG. 11 is a flow diagram of the process of setting up an example cloud desktop fabric.
Figure 12:
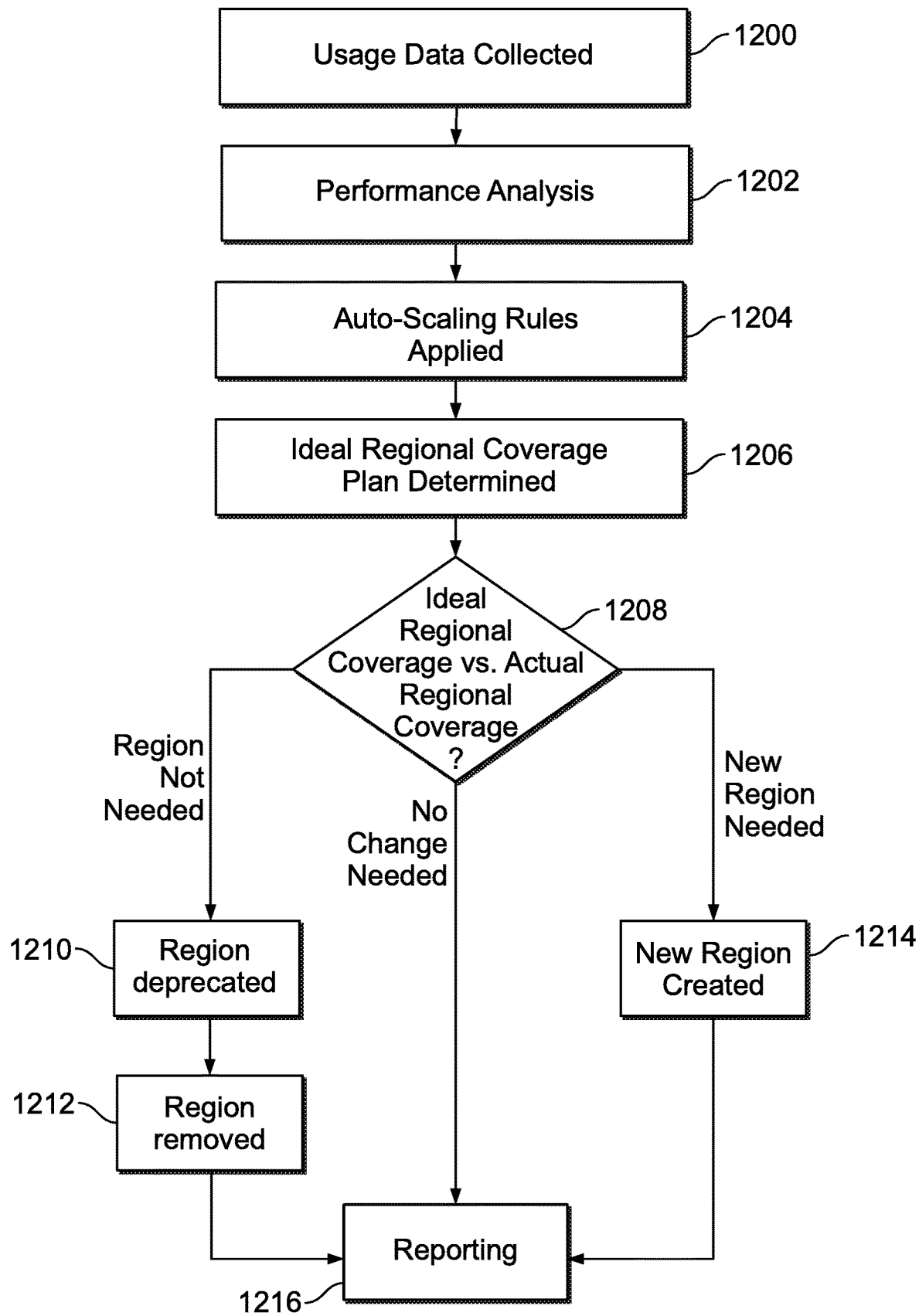
FIG. 12 is a flow diagram of the process of changing the size of the cloud desktop fabric.

FIG. 11 is a flow diagram of the routine to create a cloud desktop fabric such as the cloud desktop fabric 400 in FIG. 4A. FIG. 12 is a flow diagram of the routine to change the size of a cloud desktop fabric such as the cloud desktop fabric 400 in FIG. 4A. The flow diagrams in FIGS. 11 and 12 are representative of example machine readable instructions for the process of creating and changing the size of a cloud desktop fabric. In this example, the machine readable instructions comprise an algorithm for execution by: (a) a processor, (b) a controller, and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 11-12, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In FIG. 11, a cloud IaaS subscription is first created (1100). The subscription enables cloud APIs to be used to create and manage virtual machines, virtual networks, and other configurations in multiple regions. The virtual storage and the virtual network of the master fabric region such as the master fabric region 132 in FIG. 4A is created (1102). The cloud APIs are thus used to create at least one virtual storage resource used to persist files, and a network that is used to connect virtual storage. In addition, desktop templates, such as the desktop template 430, a gateway, such as the gateway 434, and a virtual desktop, such as the virtual desktop 432 in FIG. 4A, are created within the master fabric region. An enterprise connector is then created for the master fabric region 132 (1104). The cloud APIs are used to create at least one host running software that functions as the enterprise connector. The cloud APIs are used to create at least one gateway host such as the gateway 434 (1106).

The desktop template is then created for the master fabric region (1108). The cloud APIs are used to create at least one desktop template such as the desktop template 430. The template may be created in several ways, such as from a cloud provider marketplace or the import of a VDI desktop image. At least one global pool of desktops is then defined so that desktops may be provisioned on demand for users (1110). Desktop users are then registered and assigned to one of the global pool of desktops (1112). The desktop users may be optionally placing in a group. Either the desktop user and or the group are assigned to a global desktop pool. The cloud APIs are used to create at least one virtual storage resource used to persist files, and a network that will be used to connect virtual storage, a desktop template, a gateway, and a virtual desktop, within an expansion fabric region, such as the expansion fabric region 132 (1114). The cloud APIs and other automated logic are used to replicate the gateway 434 from the master fabric region 132 into the expansion fabric region (1116). Finally, the cloud APIs and other automated logic are used to replicate the desktop template 430 from the master fabric region 132 into the expansion region.

The process of expanding or contracting a cloud desktop fabric may be seen in FIG. 12. A desktop service control plane such as the control plane 710 in FIG. 7 continually collects usage data of the users such as those in the user group 740 in FIG. 7 (1200). The usage data may include location, network quality, performance, and network cost. The control plane 710 is operable to perform periodic performance analysis of user activity (1202). The analysis is performed to create metrics that predict user satisfaction. This may include machine learning or other techniques and can take past model data and regional infrastructure quality into account. The control plane 710 in this example applies the auto-scaling rules in relation to changing the size of the cloud desktop fabric (1204). Such rules may include configured constraints, policies, and cost information, and possibly service level agreements to determine whether the size of the cloud desktop fabric should be changed. The routine then determines the ideal regional coverage plan based on the analysis (1206). The ideal coverage plan (how many regions and which ones) is generated from the known data, possibly including administrator input and oversight.

The ideal coverage plan is compared to actual regional coverage data, to determine whether expansion fabric regions need to be added or removed from the cloud desktop fabric (1208). If it is determined that region is no longer needed, the region is deprecated (1210). A region no longer needed is marked for removal, and new connection requests will be routed to other regions. The region then may be removed (1212). Based on the determination, if necessary, one or more new expansion regions are created to implement the ideal coverage plan (1214). If no change is necessary, the cloud desktop fabric is not changed. The ideal coverage plan and actual coverage data are periodically summarized in a report that is available for analysis and oversight by administrators (1216).

Figure 13:
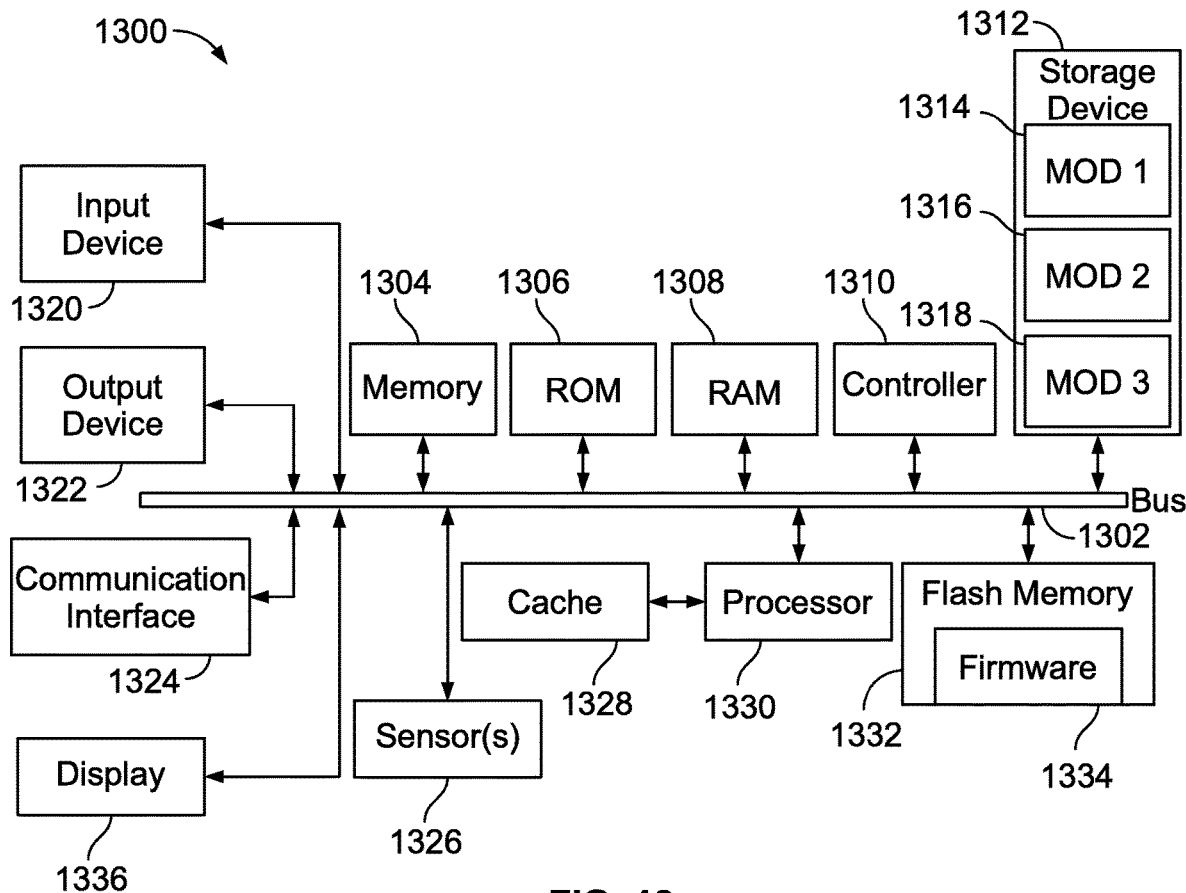
FIGS. 13 and 14 illustrate exemplary systems in accordance with various examples of the present disclosure.
Figure 14:
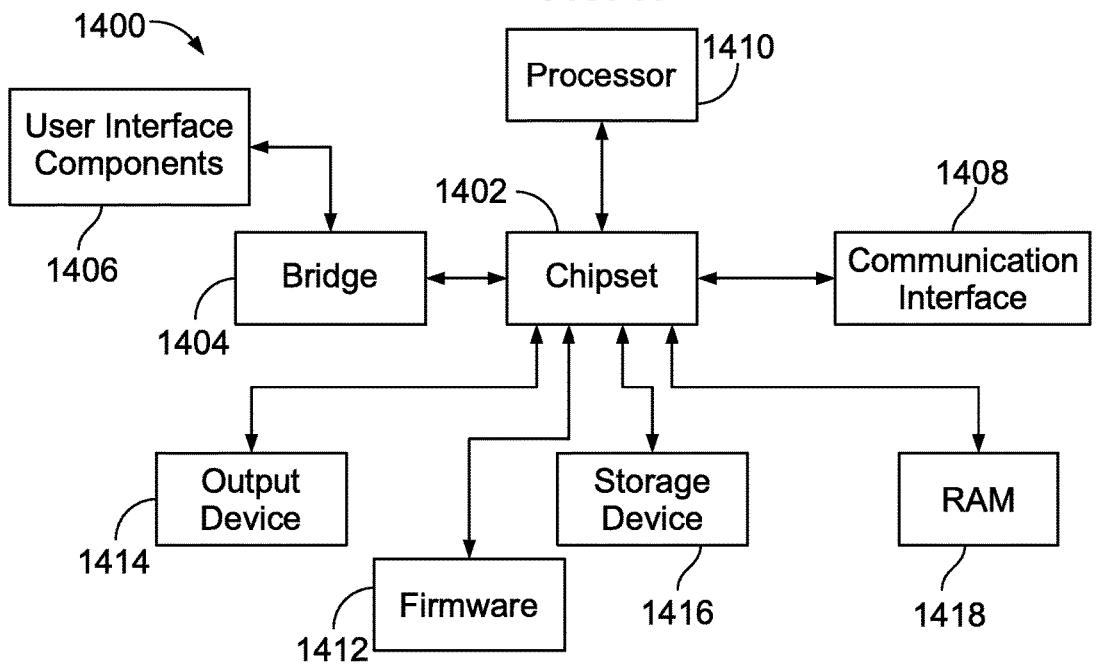

FIGS. 13-14 illustrate an example computing system 1300, in which the components of the computing system are in electrical communication with each other using a bus 1302. The system 1300 includes a processing unit (CPU or processor) 1330 and a system bus 1302 that couple various system components, including the system memory 1304 (e.g., read only memory (ROM) 1306 and random access memory (RAM) 1308), to the processor 1330. The system 1300 can include a cache of high-speed memory connected directly with, in close proximity to, or integrated as part of the processor 1330. The system 1300 can copy data from the memory 1304 and/or the storage device 1312 to the cache 1328 for quick access by the processor 1330. In this way, the cache can provide a performance boost for processor 1330 while waiting for data. These and other modules can control or be configured to control the processor 1330 to perform various actions. Other system memory 1304 may be available for use as well. The memory 1304 can include multiple different types of memory with different performance characteristics. The processor 1330 can include any general purpose processor and a hardware module or software module, such as module 1 1314, module 2 1316, and module 3 1318 embedded in storage device 1312. The hardware module or software module is configured to control the processor 1330, as well as a special-purpose processor where software instructions are incorporated into the actual processor design. The processor 1330 may essentially be a completely self-contained computing system that contains multiple cores or processors, a bus, memory controller, cache, etc. A multi-core processor may be symmetric or asymmetric.

To enable user interaction with the computing device 1300, an input device 1320 is provided as an input mechanism. The input device 1320 can comprise a microphone for speech, a touch-sensitive screen for gesture or graphical input, keyboard, mouse, motion input, and so forth. In some instances, multimodal systems can enable a user to provide multiple types of input to communicate with the system 1300. In this example, an output device 1322 is also provided. The communications interface 1324 can govern and manage the user input and system output.

Storage device 1312 can be a non-volatile memory to store data that is accessible by a computer. The storage device 1312 can be magnetic cassettes, flash memory cards, solid state memory devices, digital versatile disks, cartridges, random access memories (RAMs) 1308, read only memory (ROM) 1306, and hybrids thereof.

The controller 1310 can be a specialized microcontroller or processor on the system 1300, such as a BMC (baseboard management controller). In some cases, the controller 1310 can be part of an Intelligent Platform Management Interface (IPMI). Moreover, in some cases, the controller 1310 can be embedded on a motherboard or main circuit board of the system 1300. The controller 1310 can manage the interface between system management software and platform hardware. The controller 1310 can also communicate with various system devices and components (internal and/or external), such as controllers or peripheral components, as further described below.

The controller 1310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1310 to initiate or conduct specific hardware recovery procedures or operations, as further described below.

The controller 1310 can also include a system event log controller and/or storage for managing and maintaining events, alerts, and notifications received by the controller 1310. For example, the controller 1310 or a system event log controller can receive alerts or notifications from one or more devices and components, and maintain the alerts or notifications in a system event log storage component.

Flash memory 1332 can be an electronic non-volatile computer storage medium or chip that can be used by the system 1300 for storage and/or data transfer. The flash memory 1332 can be electrically erased and/or reprogrammed. Flash memory 1332 can include EPROM (erasable programmable read-only memory), EEPROM (electrically erasable programmable read-only memory), ROM, NVRAM, or CMOS (complementary metal-oxide semiconductor), for example. The flash memory 1332 can store the firmware 1334 executed by the system 1300 when the system 600 is first powered on, along with a set of configurations specified for the firmware 1334. The flash memory 1332 can also store configurations used by the firmware 1334.

The firmware 1334 can include a Basic Input/Output System or equivalents, such as an EFI (Extensible Firmware Interface) or UEFI (Unified Extensible Firmware Interface). The firmware 1334 can be loaded and executed as a sequence program each time the system 1300 is started. The firmware 1334 can recognize, initialize, and test hardware present in the system 600 based on the set of configurations. The firmware 1334 can perform a self-test, such as a POST (Power-On-Self-Test), on the system 1300. This self-test can test the functionality of various hardware components such as hard disk drives, optical reading devices, cooling devices, memory modules, expansion cards, and the like. The firmware 1334 can address and allocate an area in the memory 1304, ROM 1306, RAM 1308, and/or storage device 1312, to store an operating system (OS). The firmware 1334 can load a boot loader and/or OS, and give control of the system 1300 to the OS.

The firmware 1334 of the system 1300 can include a firmware configuration that defines how the firmware 1334 controls various hardware components in the system 1300. The firmware configuration can determine the order in which the various hardware components in the system 1300 are started. The firmware 1334 can provide an interface, such as an UEFI, that allows a variety of different parameters to be set, which can be different from parameters in a firmware default configuration. For example, a user (e.g., an administrator) can use the firmware 1334 to specify clock and bus speeds, define what peripherals are attached to the system 1300, set monitoring of health (e.g., fan speeds and CPU temperature limits), and/or provide a variety of other parameters that affect overall performance and power usage of the system 1300. While firmware 1334 is illustrated as being stored in the flash memory 1332, one of ordinary skill in the art will readily recognize that the firmware 1334 can be stored in other memory components, such as memory 1304 or ROM 1306.

System 1300 can include one or more sensors 1326. The one or more sensors 1326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1326 can communicate with the processor, cache 1328, flash memory 1332, communications interface 1324, memory 1304, ROM 1306, RAM 1308, controller 1310, and storage device 1312, via the bus 1302, for example. The one or more sensors 1326 can also communicate with other components in the system via one or more different means, such as inter-integrated circuit (I2C), general purpose output (GPO), and the like. Different types of sensors (e.g., sensors 1326) on the system 1300 can also report to the controller 1310 on parameters, such as cooling fan speeds, power status, operating system (OS) status, hardware status, and so forth. A display 1336 may be used by the system 1300 to provide graphics related to the applications that are executed by the controller 1310.

FIG. 14 illustrates an example computer system 1400 having a chipset architecture that can be used in executing the described method(s) or operations, and generating and displaying a graphical user interface (GUI). Computer system 1400 can include computer hardware, software, and firmware that can be used to implement the disclosed technology. System 1400 can include a processor 1410, representative of a variety of physically and/or logically distinct resources capable of executing software, firmware, and hardware configured to perform identified computations. Processor 1410 can communicate with a chipset 1402 that can control input to and output from processor 1410. In this example, chipset 1402 outputs information to output device 1414, such as a display, and can read and write information to storage device 1416. The storage device 1416 can include magnetic media, and solid state media, for example. Chipset 1402 can also read data from and write data to RAM 1418. A bridge 1404 for interfacing with a variety of user interface components 1406, can be provided for interfacing with chipset 1402. User interface components 1406 can include a keyboard, a microphone, touch detection, and processing circuitry, and a pointing device, such as a mouse.

Chipset 1402 can also interface with one or more communication interfaces 1408 that can have different physical interfaces. Such communication interfaces can include interfaces for wired and wireless local area networks, for broadband wireless networks, and for personal area networks. Further, the machine can receive inputs from a user via user interface components 1406, and execute appropriate functions, such as browsing functions by interpreting these inputs using processor 1410.

Moreover, chipset 1402 can also communicate with firmware 1412, which can be executed by the computer system 1400 when powering on. The firmware 1412 can recognize, initialize, and test hardware present in the computer system 1400 based on a set of firmware configurations. The firmware 1412 can perform a self-test, such as a POST, on the system 1400. The self-test can test the functionality of the various hardware components 1402-1418. The firmware 1412 can address and allocate an area in the memory 1418 to store an OS. The firmware 1412 can load a boot loader and/or OS, and give control of the system 1400 to the OS. In some cases, the firmware 1412 can communicate with the hardware components 1402-1410 and 1414-1418. Here, the firmware 1412 can communicate with the hardware components 1402-1410 and 1414-1418 through the chipset 1402, and/or through one or more other components. In some cases, the firmware 1412 can communicate directly with the hardware components 1402-1410 and 1414-1418.

It can be appreciated that example systems 1300 (in FIG. 13) and 1400 can have more than one processor (e.g., 1330, 1410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A virtual desktop system comprising:
a master fabric region including configurations and definitions required to manage a desktop service within a first regional cloud datacenter in a first geographical location for provisioning and lifecycle managing of a desktop, wherein the configurations and definitions include configurations and definitions for a virtual network allowing secure access for a user to the desktop and allowing access by the desktop to other resources, configurations and definitions for clusters of gateways, and configurations and definitions for data storage within the first regional data center;
a plurality of expansion fabric regions, each of the expansion fabric regions including an agent program that collects performance information for its associated expansion region and the expansion fabric region further including a copy of configurations and definitions for provisioning the desktop, the copy of configurations and definitions replicated from the master fabric region and applied to a second regional cloud datacenter in a second geographical location, different from the first geographical location, wherein the desktop is accessible by the user from one of the master fabric region or the plurality of expansion fabric regions using a gateway, storage, and virtual network configured and defined by the configurations and definitions; and
a centralized control plane including a monitoring service, a desktop management service, and a configuration service, the control plane operable to:
receive, by the monitoring service, performance information from each of the agent programs installed on each expansion fabric region, the performance information including connection data, memory usage, and average network latency for a respective expansion fabric region; and
in response, the received performance information triggering a predefined rule to:
add, by the configuration service, a new expansion fabric region to the plurality of expansion fabric regions by copying the configurations and definitions of the master fabric region to a new regional cloud datacenter, or eliminate, by the desktop management service, one of the plurality of expansion fabric regions, wherein the desktop is accessed from the master fabric region at a first time and accessed from one of the plurality of expansion fabric regions at a second time.

2. The system of claim 1, wherein the replicated configurations and definitions resources include a desktop template associated with the desktop.

3. The system of claim 1, wherein the new expansion fabric region includes the configurations and definitions replicated from the master fabric region for provisioning the desktop.

4. The system of claim 1, wherein the control plane adds the new expansion fabric region or eliminates one of the plurality of expansion fabric regions according to a rule.

5. The system of claim 4, wherein the rule includes creating the new expansion fabric region or eliminating one of the plurality of expansion fabric regions based on at least one of optimizing network latency between the user and the dependent cloud resources, maintaining a service-level agreement with a customer representing the user, optimizing resource utilization, or distributing workloads.

6. The system of claim 4, wherein the rule includes eliminating one of the plurality of expansion fabric regions based on at least one of maintaining a service-level agreement with a customer representing the user, optimizing resource utilization, or unused expansion fabric regions.

7. The system of claim 1, wherein the control plane includes an administration tool allowing an administrative user to add the additional expansion fabric region or eliminate one of the plurality of expansion fabric regions.

8. The system of claim 1, wherein the control plane provisions the additional expansion region based an output of a machine learning module having inputs of network activity data.

9. The system of claim 1, wherein the control plane includes a prediction module that collects data from agents in the fabric regions and predicts a change in needs of users, and wherein either the new expansion fabric region is added or one of the plurality of expansion regions is eliminated based on the prediction.

10. A method to expand a cloud desktop fabric to provide access to desktops to geographically dispersed users, the cloud desktop fabric including a master fabric region including configurations and definitions required to manage a desktop service within a first regional cloud datacenter in a first geographical location for provisioning and lifecycle managing of a desktop, wherein the configurations and definitions include configurations and definitions for a virtual network allowing secure access for a user to the desktop and allowing access by the desktop to other resources, configurations and definitions for clusters of gateways, and configurations and definitions for data storage within the first regional data center, and a plurality of expansion fabric regions, each of the expansion fabric regions including an agent program that collects performance information for its associated expansion region and the expansion fabric region further including a copy of configurations and definitions for provisioning the desktop, the copy of configurations and definitions replicated from the master fabric region and applied to a second regional cloud datacenter in a second geographical location, different from the first geographical location, wherein the desktop is accessible by the user from one of the master fabric region or the plurality of expansion fabric regions using a gateway, storage, and virtual network configured and defined by the configurations and definitions, the method comprising:

collecting usage data from a plurality of users provided with access to desktops in the cloud desktop fabric via a centralized control plane, the centralized control plane including a monitoring service, a desktop management service, and a configuration service;

receiving, by the monitoring service, performance information from each of the agent programs installed on each expansion fabric region, the performance information including connection data, memory usage, and average network latency for a respective expansion fabric region; and in response the received performance information triggering a predefined rule:

adding, by the configuration service, a new expansion fabric region to the plurality of expansion fabric regions by copying the configurations and definitions of the master fabric region to a new regional cloud datacenter, or eliminate, by the desktop management service, one of the plurality of expansion fabric regions, wherein the desktop is accessed from the master fabric region at a first time and accessed from one of the plurality of expansion fabric regions at a second time.

11. The method of claim 10, wherein the replicated configurations and definitions include a desktop template associated with the desktop.

12. The method of claim 10, wherein the control plane creates the new expansion fabric region according to a rule.

13. The method of claim 12 wherein the rule includes creating the new expansion fabric based on at least one of optimizing network latency between the user and the dependent cloud resources, maintaining a service-level agreement with the customer representing the user, optimizing resource utilization, or distributing workloads.

14. The method of claim 10, wherein the control plane includes an administration tool allowing an administrative user to configure the new expansion fabric region.

15. The method of claim 10, wherein the control plane creates the expansion region according to predicted user traffic in the global pool based on machine learning from past user traffic.

16. The method of claim 15, wherein the control plane eliminates the new expansion region after a period of time according to predicted user traffic in the global pool based on the machine learning.

17. The method of claim 15, wherein the control plane creates the new expansion region based on a predicted increase of network latency from the past activity of the global pool.

18. A computer program product in a non-transitory computer readable medium for use in a data processing system, the computer program product holding computer program instructions executed by the data processing system to expand a cloud desktop fabric to provide access to desktops to geographically dispersed users, the cloud desktop fabric including a master fabric region including configurations and definitions required to manage a desktop service within a first regional cloud datacenter in a first geographical location for provisioning and lifecycle managing of a desktop, wherein the configurations and definitions include configurations and definitions for a virtual network allowing secure access for a user to the desktop and allowing access by the desktop to other resources, configurations and definitions for clusters of gateways, and configurations and definitions for data storage within the first regional data center, and a plurality of expansion fabric regions, each of the expansion fabric regions including an agent program that collects performance information for its associated expansion region and the expansion fabric region further including a copy of configurations and definitions for provisioning the desktop, the copy of configurations and definitions replicated from the master fabric region and applied to a second regional cloud datacenter in a second geographical location, different from the first geographical location, wherein the desktop is accessible by the user from one of the master fabric region or the plurality of expansion fabric regions using a gateway, storage, and virtual network configured and defined by the configurations and definitions, the computer program instructions comprising program code configured to:

collect usage data from a plurality of users provided with access to desktops in the cloud desktop fabric via a centralized control plane, the centralized control plane including a monitoring service, a desktop management service, and a configuration service;

receive, by the monitoring service, performance information from each of the agent programs installed on each expansion fabric region, the performance information including connection data, memory usage, and average network latency for a respective expansion fabric region; and in response the received performance information triggering a predefined rule:

add, by the configuration service, a new expansion fabric region to the plurality of expansion fabric regions by copying the configurations and definitions of the master fabric region to a new regional cloud datacenter, or eliminate, by the desktop management service, one of the plurality of expansion fabric regions, wherein the desktop is accessed from the master fabric region at a first time and accessed from one of the plurality of expansion fabric regions at a second time.

* * * * *

UNITED STATES PATENT AND TRADEMARK OFFICE
CERTIFICATE OF CORRECTION

PATENT NO. : 11,550,603 B2
APPLICATION NO. : 16/656250
DATED : January 10, 2023
INVENTOR(S) : David T. Sulcer et al.

It is certified that error appears in the above-identified patent and that said Letters Patent is hereby corrected as shown below:

In the Claims

At Column 29, Line 8 (Claim 2, Line 2), please delete "resources".

Signed and Sealed this
Twenty-eighth Day of March, 2023

Katherine Kelly Vidal
*Director of the United States Patent and Trademark Office*